(12) United States Patent
Becker et al.

(10) Patent No.: US 9,004,516 B2
(45) Date of Patent: *Apr. 14, 2015

(54) BICYCLE FORK HAVING LOCK-OUT, BLOW-OFF, AND ADJUSTABLE BLOW-OFF THRESHOLD

(71) Applicant: Fox Factory, Inc., Watsonville, CA (US)

(72) Inventors: William M. Becker, Aptos, CA (US); Brian Lampman, Aptos, CA (US)

(73) Assignee: Fox Factory Inc., Watsonville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/256,621

(22) Filed: Apr. 18, 2014

(65) Prior Publication Data

US 2014/0224607 A1  Aug. 14, 2014

Related U.S. Application Data

(63) Continuation of application No. 13/898,396, filed on May 20, 2013, now Pat. No. 8,727,366, which is a continuation of application No. 13/250,886, filed on Sep. 30, 2011, now Pat. No. 8,459,418, which is a (Continued)

(51) Int. Cl.
| | |
|---|---|
| *B62K 1/00* | (2006.01) |
| *B62K 17/00* | (2006.01) |
| *F16F 9/34* | (2006.01) |
| *B62K 25/08* | (2006.01) |
| *B62K 25/28* | (2006.01) |
| *F16F 9/06* | (2006.01) |
| *B60G 17/08* | (2006.01) |
| *B62K 25/04* | (2006.01) |

(52) U.S. Cl.
CPC . *F16F 9/34* (2013.01); *B62K 25/08* (2013.01); *B62K 25/286* (2013.01); *F16F 9/064* (2013.01); *B60G 17/08* (2013.01); *B62K 2025/048* (2013.01)

(58) Field of Classification Search
USPC ........ 188/217, 281, 282.1, 282.8, 282.9, 276, 188/285, 297, 313, 314, 316, 317, 322.13; 280/276, 279
See application file for complete search history.

(56) References Cited

U.S. PATENT DOCUMENTS

| | | |
|---|---|---|
| 541,891 A | 7/1895 | Stiebel, Jr. |
| 1,281,079 A | 10/1918 | Sears |

(Continued)

FOREIGN PATENT DOCUMENTS

| | | |
|---|---|---|
| DE | 837508 C | 4/1952 |
| DE | 4429561 A1 | 2/1996 |

(Continued)

OTHER PUBLICATIONS

"Bici Da Montagne", Mar. 1994.

(Continued)

*Primary Examiner* — Toan To

(57) ABSTRACT

A bicycle fork includes a pair of fork leg assemblies, each of the leg assemblies having an upper leg telescopingly engaged with a lower leg. A damping assembly is provided in at least one of the legs. The damping assembly includes lock-out and blow-off compression circuits. These compression circuits are externally adjustable without tools. Furthermore, these two compression circuits may be adjusted independently of each other.

8 Claims, 15 Drawing Sheets

Related U.S. Application Data continuation of application No. 12/732,245, filed on Mar. 26, 2010, now Pat. No. 8,033,368, which is a continuation of application No. 11/532,524, filed on Sep. 16, 2006, now Pat. No. 7,708,296, which is a continuation of application No. 10/620,323, filed on Jul. 15, 2003, now Pat. No. 7,163,222, which is a continuation of application No. 09/897,706, filed on Jul. 2, 2001, now Pat. No. 6,592,136.

(56) References Cited

U.S. PATENT DOCUMENTS

| | | |
|---|---|---|
| 1,492,328 A | 4/1924 | Lang |
| 2,329,803 A | 9/1943 | Whisler, Jr. |
| 2,460,797 A | 2/1949 | Allington |
| 2,774,448 A | 12/1956 | Hultin |
| 3,086,786 A | 4/1963 | Tuczek |
| 3,114,705 A | 12/1963 | Prihonic et al. |
| 3,319,741 A | 5/1967 | Hauck |
| 3,338,347 A | 8/1967 | Avner |
| 3,414,092 A | 12/1968 | Speckhart |
| 3,836,132 A | 9/1974 | McNally et al. |
| 4,145,067 A | 3/1979 | Ceriani |
| 4,254,849 A | 3/1981 | Pohlenz |
| 4,295,658 A | 10/1981 | Kashima |
| 4,313,529 A | 2/1982 | Kato et al. |
| 4,492,290 A | 1/1985 | Zavodny |
| 4,527,676 A | 7/1985 | Emura et al. |
| 4,530,425 A | 7/1985 | Veaux et al. |
| 4,561,669 A | 12/1985 | Simons |
| 4,572,317 A | 2/1986 | Isono et al. |
| 4,576,258 A | 3/1986 | Spisak et al. |
| 4,591,186 A | 5/1986 | Ashiba |
| 4,606,440 A | 8/1986 | Buchanan et al. |
| 4,620,619 A | 11/1986 | Emura et al. |
| 4,647,069 A | 3/1987 | Iijima |
| 4,650,212 A | 3/1987 | Yoshimura |
| 4,660,688 A | 4/1987 | Spisak et al. |
| 4,679,811 A | 7/1987 | Shuler |
| 4,686,626 A | 8/1987 | Kuroki et al. |
| 4,717,173 A | 1/1988 | Sugasawa et al. |
| 4,741,554 A | 5/1988 | Okamoto |
| 4,787,644 A | 11/1988 | Yokote et al. |
| 4,789,051 A | 12/1988 | Kruckemeyer et al. |
| 4,827,416 A | 5/1989 | Kawagoe et al. |
| 4,917,222 A | 4/1990 | Bacardit |
| 4,936,423 A | 6/1990 | Karnopp |
| 4,964,625 A | 10/1990 | Kawamura |
| 4,971,344 A | 11/1990 | Turner |
| 4,993,523 A | 2/1991 | Schwemmer et al. |
| 5,072,813 A | 12/1991 | Yoshioka et al. |
| 5,080,205 A | 1/1992 | Miller et al. |
| 5,139,119 A | 8/1992 | Karnopp |
| 5,150,775 A | 9/1992 | Charles et al. |
| 5,163,538 A | 11/1992 | Derr et al. |
| 5,180,186 A | 1/1993 | Charles et al. |
| 5,186,481 A | 2/1993 | Turner |
| 5,201,388 A | 4/1993 | Malm |
| 5,201,389 A | 4/1993 | Miller et al. |
| 5,251,927 A | 10/1993 | Charles et al. |
| 5,285,875 A | 2/1994 | Munoz |
| 5,285,876 A | 2/1994 | Shimizu et al. |
| 5,301,973 A | 4/1994 | Truchinski |
| 5,308,099 A | 5/1994 | Browning |
| 5,332,068 A | 7/1994 | Richardson et al. |
| 5,354,085 A | 10/1994 | Gally |
| 5,360,089 A | 11/1994 | Nakamura et al. |
| 5,386,893 A | 2/1995 | Feigel |
| 5,396,973 A | 3/1995 | Schwemmer et al. |
| 5,445,401 A | 8/1995 | Bradbury |
| 5,456,480 A | 10/1995 | Turner et al. |
| 5,462,140 A | 10/1995 | Cazort et al. |
| 5,494,302 A | 2/1996 | Farris et al. |
| 5,509,674 A | 4/1996 | Browning |
| 5,509,677 A | 4/1996 | Bradbury |
| 5,529,152 A | 6/1996 | Hamilton et al. |
| 5,533,597 A | 7/1996 | Nezu et al. |
| 5,580,075 A | 12/1996 | Turner et al. |
| 5,586,781 A | 12/1996 | Anderson |
| 5,598,903 A | 2/1997 | Richardson |
| 5,634,652 A | 6/1997 | Tsai |
| 5,653,315 A | 8/1997 | Ekquist et al. |
| 5,702,092 A | 12/1997 | Farris et al. |
| 5,803,482 A | 9/1998 | Kim |
| 5,829,773 A | 11/1998 | Rajaee |
| 5,832,305 A | 11/1998 | Briggs et al. |
| 5,842,688 A | 12/1998 | Dore et al. |
| 5,848,675 A | 12/1998 | Gonzalez |
| 5,908,200 A | 6/1999 | Stewart |
| 5,954,167 A | 9/1999 | Richardson et al. |
| 5,971,116 A | 10/1999 | Franklin |
| 5,996,746 A | 12/1999 | Turner et al. |
| 6,024,370 A | 2/2000 | Baldomero |
| 6,026,939 A | 2/2000 | Girvin et al. |
| 6,036,212 A | 3/2000 | Baldomero |
| 6,095,541 A | 8/2000 | Turner et al. |
| 6,105,987 A | 8/2000 | Turner |
| 6,105,988 A | 8/2000 | Turner et al. |
| 6,119,830 A | 9/2000 | Richardson et al. |
| 6,120,049 A | 9/2000 | Gonzalez et al. |
| 6,206,152 B1 | 3/2001 | Grundei et al. |
| 6,217,049 B1 | 4/2001 | Becker |
| 6,260,832 B1 | 7/2001 | Vignocchi et al. |
| 6,267,400 B1 | 7/2001 | McAndrews |
| 6,343,807 B1 | 2/2002 | Rathbun |
| 6,360,857 B1 | 3/2002 | Fox et al. |
| 6,382,370 B1 | 5/2002 | Girvin |
| 6,457,730 B1 | 10/2002 | Urbach |
| 6,464,053 B1 | 10/2002 | Hoebrechts |
| 6,467,592 B1 | 10/2002 | Dernebo |
| 6,505,719 B2 | 1/2003 | Gonzalez et al. |
| 6,581,948 B2 | 6/2003 | Fox |
| 6,592,136 B2 * | 7/2003 | Becker et al. .................. 280/276 |
| 6,604,751 B2 | 8/2003 | Fox |
| 6,659,240 B2 | 12/2003 | Dernebo |
| 6,659,241 B2 | 12/2003 | Sendrea |
| 6,722,678 B2 | 4/2004 | McAndrews |
| 6,786,498 B1 | 9/2004 | Chang |
| 6,866,281 B2 | 3/2005 | Chamberlain et al. |
| 6,976,692 B2 | 12/2005 | Miyoshi et al. |
| 6,978,872 B2 | 12/2005 | Turner |
| 6,991,076 B2 | 1/2006 | McAndrews |
| 7,017,928 B2 | 3/2006 | Felsl et al. |
| 7,128,192 B2 | 10/2006 | Fox |
| 7,163,222 B2 * | 1/2007 | Becker et al. .................. 280/276 |
| 7,163,223 B2 | 1/2007 | Wesling et al. |
| 7,182,358 B2 | 2/2007 | Felsl et al. |
| 7,188,712 B2 | 3/2007 | Vogelsang et al. |
| 7,195,234 B2 * | 3/2007 | Jordan et al. ................ 267/64.11 |
| 7,472,918 B2 | 1/2009 | Turner |
| 7,641,028 B2 | 1/2010 | Fox |
| 7,708,296 B2 | 5/2010 | Becker et al. |
| 8,029,010 B2 | 10/2011 | Achenbach |
| 8,033,368 B2 * | 10/2011 | Becker et al. ............. 188/322.13 |
| 8,251,376 B2 * | 8/2012 | Mouri et al. ................. 280/5.515 |
| 8,256,787 B2 | 9/2012 | Inoue et al. |
| 8,459,418 B2 * | 6/2013 | Becker et al. .................. 188/314 |
| 8,672,106 B2 * | 3/2014 | Laird et al. .................... 188/275 |
| 8,727,366 B2 * | 5/2014 | Becker et al. .................. 280/276 |
| 8,752,681 B2 * | 6/2014 | Fox ............................. 188/299.1 |
| 2001/0040078 A1 | 11/2001 | Gonzalez et al. |
| 2002/0113393 A1 | 8/2002 | Urbach |
| 2002/0117830 A1 | 8/2002 | Holt et al. |
| 2002/0149141 A1 | 10/2002 | McAndrews |
| 2003/0038411 A1 | 2/2003 | Sendrea |
| 2003/0075403 A1 | 4/2003 | Dernebo |
| 2004/0020730 A1 | 2/2004 | Turner |
| 2004/0061303 A1 | 4/2004 | Felsl et al. |
| 2004/0222056 A1 | 11/2004 | Fox |
| 2004/0232650 A1 | 11/2004 | Felsl et al. |
| 2004/0245746 A1 | 12/2004 | Chamberlain et al. |
| 2005/0012297 A1 | 1/2005 | Miyoshi et al. |
| 2005/0023094 A1 | 2/2005 | McAndrews |

(56) References Cited

U.S. PATENT DOCUMENTS

| | | | | |
|---|---|---|---|---|
| 2005/0087953 | A1* | 4/2005 | Becker et al. | 280/276 |
| 2005/0104320 | A1 | 5/2005 | Wesling et al. | |
| 2005/0173212 | A1 | 8/2005 | Vogelsang et al. | |
| 2006/0087096 | A1* | 4/2006 | Turner | 280/279 |
| 2008/0179795 | A1* | 7/2008 | Fox | 267/64.11 |
| 2010/0117321 | A1* | 5/2010 | Achenbach | 280/124.102 |
| 2011/0084464 | A1* | 4/2011 | Inoue et al. | 280/276 |
| 2011/0187076 | A1* | 8/2011 | Gonzalez et al. | 280/276 |
| 2012/0166044 | A1* | 6/2012 | Battlogg et al. | 701/37 |
| 2012/0235332 | A1* | 9/2012 | Jordan et al. | 267/64.26 |

FOREIGN PATENT DOCUMENTS

| | | |
|---|---|---|
| EP | 245221 A2 | 11/1987 |
| EP | 420610 A1 | 4/1991 |
| EP | 834448 A2 | 4/1998 |
| FR | 2206723 A5 | 6/1974 |
| GB | 2286566 A | 8/1995 |
| JP | 7-238973 | 9/1995 |
| JP | 2000-97272 | 4/2000 |
| JP | 2000-264277 | 9/2000 |
| WO | 99/03726 | 1/1999 |
| WO | 99/14104 | 3/1999 |
| WO | 99/25989 | 5/1999 |

OTHER PUBLICATIONS

"Bicycle Guide", Jul. 1994.
"Bicycling", Aug. 1993.
"Bike Pulse", May 2000.
"Cannondale Documents", Various Articles, 1993.
"Cerian 1 Various Articles".
"Forks Listing", 1987-1991, 1 page.
"Fox Document Various Articles", Motorcross Action, Dec. 1891; Fox Factory 1983; Moto-X Fox 1981, Vanilla Float 1998; Mountain Biking Oct. 1998; Cycle World Dec. 1981.
"Marzoochi Literature".
Cunningham, Richard, "Fox Unveils Production Suspension Fork".
Turner, Paul, "Profile", Various Articles: Mavericks American.
Yamaha, "Owners's Service Manual", 1897, 11 pages.
"Mountain Bike", Aug. 2011.
"Mountain Bike Action", Vaious Articles (Feb. 1992, Jan. 1993, Nov. 1991, Jan. 1993, Dec. 1997, Feb. 1991).
"Mountain Bike Action", http://www.mbaction.com/detail/asp?id=335, Apr. 5, 2001.
"Mountain Biking", Oct. 1996.
"Mountain Tutto Bike", Sep. 1992.
"Road Bike", Aug. 1993.
"Rock Shox Documents Collection", Various Articles (1993, 19961998, 2000, 2004), 59 pages.
"Sospensioni", Jan. 1993.

* cited by examiner

BICYCLE FORK HAVING LOCK-OUT, BLOW-OFF, AND ADJUSTABLE BLOW-OFF THRESHOLD

CROSS-REFERENCE TO RELATED APPLICATIONS

This application is a continuation of and claims the benefit of and claims priority to co-pending U.S. patent application Ser. No. 13/898,396, filed on May 20, 2013, entitled "BICYCLE FORK HAVING LOCK-OUT, BLOW-OFF, AND ADJUSTABLE BLOW-OFF THRESHOLD" by Becker et al., assigned to the assignee of the present application, and is hereby incorporated by reference in its entirety.

The application with Ser. No. 13/898,396 is a continuation of and claims the benefit of and claims priority to U.S. patent application Ser. No. 13/250,886, filed on Sep. 30, 2011, entitled "BICYCLE FORK HAVING LOCK-OUT, BLOW-OFF, AND ADJUSTABLE BLOW-OFF THRESHOLD" by Becker et al., now U.S. Pat. No. 8,459,418, assigned to the assignee of the present application, and is hereby incorporated by reference in its entirety herein.

The application with Ser. No. 13/250,886 is a continuation of and claims the benefit of and claims priority to U.S. patent application Ser. No. 12/732,245, filed on Mar. 26, 2010, entitled "BICYCLE FORK HAVING LOCK-OUT, BLOW-OFF, AND ADJUSTABLE BLOW-OFF THRESHOLD" by Becker et al., now U.S. Pat. No. 8,033,368, assigned to the assignee of the present application, and is hereby incorporated by reference in its entirety herein.

The application with Ser. No. 12/732,245 is a continuation of and claims the benefit of and claims priority to U.S. patent application Ser. No. 11/532,524, filed on Sep. 16, 2006, entitled "BICYCLE FORK HAVING LOCK-OUT, BLOW-OFF, AND ADJUSTABLE BLOW-OFF THRESHOLD" by Becker et al., now U.S. Pat. No. 7,708,296, assigned to the assignee of the present application, and is hereby incorporated by reference in its entirety herein.

The application with Ser. No. 11/532,524 is a continuation of and claims the benefit of and claims priority to U.S. patent application Ser. No. 10/620,323, filed on Jul. 15, 2003, entitled "BICYCLE FORK HAVING LOCK-OUT, BLOW-OFF, AND ADJUSTABLE BLOW-OFF THRESHOLD" by Becker et al., now U.S. Pat. No. 7,163,222, assigned to the assignee of the present application, and is hereby incorporated by reference in its entirety herein.

The application with Ser. No. 10/620,323 is a continuation of and claims the benefit of and claims priority to U.S. patent application Ser. No. 09/897,706, filed on Jul. 2, 2001, entitled "BICYCLE FORK CARTRIDGE ASSEMBLY" by Becker et al., now U.S. Pat. No. 6,592,136, assigned to the assignee of the present application, and is hereby incorporated by reference in its entirety herein.

BACKGROUND OF THE INVENTION

1. Field of the Invention

The present invention is generally related to vehicle suspension assemblies. More particularly, the present invention is related to a front suspension fork for use on an off-road bicycle.

2. Description of Related Art

Suspension fork assemblies are often utilized on off-road bicycles, or mountain bikes, to absorb energy imparted to the front wheel by the terrain on which the bicycle is being ridden. The use of a suspension fork allows a rider to traverse rougher terrain, at a greater speed and with less fatigue in comparison to riding a bicycle equipped with a rigid fork. Due to the fact that bicycle riders vary greatly in both weight and riding ability, it is highly desirable that certain performance aspects of the suspension fork, such as compression and rebound damping characteristics, be capable of adjustment to suit a particular individual.

To avoid the need to disassemble the fork in order to adjust the suspension settings, it is preferable to locate the adjustment controls such that they are externally accessible. Furthermore, an individual rider is likely to ride in wide variety of terrain conditions, often during the course of a single ride or race. Accordingly, adjustment of the damping characteristics while riding is greatly facilitated by locating the adjustment controls on an upper portion of the suspension fork.

Ideally, the adjustment controls would be disposed on a damper cap assembly at the top of one of the fork legs and include a compression lock-out for substantially preventing compression of the fork. The compression lock-out feature is desirable so that the suspension fork may selectively behave substantially as a rigid fork while riding on smooth terrain, to enhance both handling and power transfer to the rear wheel of the bicycle. However, prior art mountain bike suspension forks have failed to provide both a compression lock-out feature and external damping adjustment controls that are easily accessible while riding. Further, existing mechanisms for providing external damping adjustment and compression lock-out require undue complexity. Thus, an improved mountain bike suspension fork is desirable.

SUMMARY OF THE INVENTION

Preferred embodiments of the present suspension fork include a damping assembly having a damping control assembly located at an upper portion of the fork. A hollow shaft connects a piston to the control assembly. On compression of the fork, damping fluid flows upward through the central passage of the shaft to the damping control assembly. With such a fluid flow arrangement, a simplified arrangement of externally accessible controls may be disposed on the control assembly. This arrangement permits compression damping, rebound damping and compression lock-out controls to be collectively located so as to be accessible to a rider of a bicycle, while the bicycle is being ridden.

In addition, a reservoir is preferably disposed in a lower portion of the fork such that fluid exiting the damping control assembly travels in a downward direction due to gravity, substantially the entire length of the fork. This arrangement advantageously allows the damping fluid to also lubricate certain internal components of the fork, including bushings, seals and a suspension coil spring, if provided.

A preferred embodiment comprises a bicycle front fork including an upper tube having a top portion, a bottom portion and an intermediate portion. A lower tube having a top portion, a bottom portion and an intermediate portion is telescopingly movable with respect to the upper tube. An upper control assembly is positioned at the top portion of the upper tube. A damping cartridge is positioned at least partly within the lower tube and defines a top portion, a bottom portion and an intermediate portion. At least a section of the lower tube surrounding the cartridge, at least partially defines a reservoir. A shaft extends from the top portion of the upper tube into the damping cartridge. A main damping piston is connected to the shaft and positioned in the cartridge. At least the bottom portion of the cartridge defines a lower internal chamber located below the piston. The piston, the shaft and the control assembly cooperate to define a flow channel from the chamber through the piston, the shaft and the control assembly to the reservoir.

A preferred embodiment comprises a bicycle front fork including an upper tube having a top portion, a bottom portion and an intermediate portion. A lower tube having a top portion, a bottom portion and an intermediate portion is telescopingly movable with respect to the upper tube. An upper control assembly is positioned at the top portion of the upper tube. A damping cartridge is positioned at least partly within the lower tube and defines a top portion, a bottom portion and an intermediate portion. At least a section of the lower tube surrounding the cartridge, at least partially defines a reservoir. The bottom portion of the damping cartridge defines a lower control assembly which operates to permit fluid to enter the cartridge from the reservoir through the lower control assembly, but prevents fluid from exiting the cartridge at low pressure levels. A shaft extends from the top portion of the upper tube into the damping cartridge. A main damping piston is connected to the shaft and positioned in the cartridges At least the bottom portion of the cartridge defines a lower internal chamber located below the piston. The piston, the shaft and the control assembly cooperate to define a flow channel from the chamber through the piston, the shaft and the control assembly to the reservoir. The upper control assembly includes a one-way valve which prevents the flow of fluid from the reservoir through the control assembly when the shaft and the piston move upward away from the bottom portion of the damping cartridge.

A preferred embodiment comprises a bicycle front fork including an upper tube having a top portion, a bottom portion and an intermediate portion. A lower tube having a top portion, a bottom portion and an intermediate portion is telescopingly movable with respect to the upper tube. An upper control assembly is positioned at the top portion of the upper tube. A damping cartridge is positioned at least partly within the lower tube and defines a top portion, a bottom portion and an intermediate portion. At least a section of the lower tube surrounding the cartridge, at least partially defines a reservoir. A shaft extends from the top portion of the upper tube into the damping cartridge. A main damping piston is connected to the shaft and positioned in the cartridge. At least the bottom portion of the cartridge defines a lower internal chamber located below the piston. The piston, the shaft and the control assembly cooperate to define a flow channel from the chamber through the piston, the shaft and the control assembly to the reservoir. The upper control assembly also includes a lock-out valve which selectively prevents the flow of fluid from the shaft through the assembly and to the reservoir.

A preferred embodiment comprises a bicycle front fork including an upper tube having a top portion, a bottom portion and an intermediate portion. A lower tube having a top portion, a bottom portion and an intermediate portion is telescopingly movable with respect to the upper tube. An upper control assembly is positioned at the top portion of the upper tube. A damping cartridge is positioned at least partly within the lower tube and defines a top portion, a bottom portion and an intermediate portion. At least a section of the lower tube surrounding the cartridge, at least partially defines a reservoir. A shaft extends from the top portion of the upper tube into the damping cartridge. A main damping piston is connected to the shaft and positioned in the cartridge. At least the bottom portion of the cartridge defines a lower internal chamber located below the piston. The piston, the shaft and the control assembly cooperate to define a flow channel from the chamber through the piston, the shaft and the control assembly to the reservoir. A blow-off valve is positioned at the bottom portion of the cartridge to permit flow through the blow-off valve and into the reservoir in response to a threshold blow-off pressure.

A preferred embodiment comprises a bicycle front fork including an upper tube having a top portion, a bottom portion and an intermediate portion. A lower tube having a top portion, a bottom portion and an intermediate portion is telescopingly movable with respect to the upper tube. A shaft extends axially from the top portion of the upper tube. A main damping piston is connected to the shaft and at least partially defines a damping chamber. The fork defines a low speed compression circuit and a rebound circuit. A control assembly located at the top portion of the upper tube includes a first control connected to the low speed compression circuit and is manually adjustable, external of the fork. In a first position, fluid is able to flow through the low speed compression circuit and, in a second position, flow through said low speed compression circuit is prevented. A second control is connected to the rebound circuit and is manually adjustable, from external of the fork. In a first position, a first rate of flow through the rebound circuit is permitted and, in a second position, a second rate of flow through the rebound circuit is permitted. The first rate of flow is higher than said second rate of flow. The control assembly also comprises a third control connected to a restrictor, which communicates with the low speed compression circuit. The restrictor is manually movable from external of the fork between at least a first position, wherein the restrictor provides at least a first amount of resistance to flow through the low speed compression circuit, and a second position, wherein the restrictor provides a second amount of resistance to flow through the low speed compression circuit.

A preferred embodiment comprises a bicycle front fork including an upper tube having a top portion, a bottom portion and an intermediate portion. A lower tube having a top portion, a bottom portion and an intermediate portion is telescopingly movable with respect to the upper tube. A shaft extends, axially from the top portion of the upper tube. A main damping piston is connected to the shaft and at least partially defines a damping chamber. The fork defines a low speed compression circuit. A control assembly located at the top portion of the upper tube includes a first control connected to the low speed compression circuit and is manually adjustable, external of the fork. In a first position, fluid is able to flow through the low speed compression circuit and, in a second position, flow through said low speed compression circuit is prevented. The control assembly also comprises a second control connected to a restrictor, which communicates with the low speed compression circuit. The restrictor is manually movable from external of the fork between at least a first position, wherein the restrictor provides at least a first amount of resistance to flow through the low speed compression circuit, and a second position, wherein the restrictor provides a second amount of resistance to flow through the low speed compression circuit.

A preferred embodiment comprises a shock absorber including an upper tube having a top portion, a bottom portion and an intermediate portion. A lower tube having a top portion, a bottom portion and an intermediate portion is telescopingly movable with respect to the upper tube. An upper control assembly is positioned at the top portion of the upper tube. A damping cartridge is positioned at least partly within the lower tube and defines a top portion, a bottom portion and an intermediate portion. At least a section of the lower tube surrounding the cartridge, at least partially defines a reservoir. A shaft extends from the top portion of the upper tube into the damping cartridge. A main damping piston is connected to the shaft and positioned in the cartridge. At least the bottom portion of the cartridge defines a lower internal chamber located below the piston. The piston, the shaft and the control assembly cooperate to define a flow channel from the chamber through the piston, the shaft and the control assembly to the reservoir.

A preferred embodiment comprises a bicycle having a front fork. The front fork includes an upper tube having a top portion, a bottom portion and an intermediate portion. A lower tube having a top portion, a bottom portion and an intermediate portion is telescopingly movable with respect to the upper tube. An upper control assembly is positioned at the top portion of the upper tube. A damping cartridge is positioned at least partly within the lower tube and defines a top portion, a bottom portion and an intermediate portion. At least a section of the lower tube surrounding the cartridge, at least partially, defines a reservoir. A shaft extends from the top portion of the upper tube into the damping cartridge. A main damping piston is connected to the shaft and positioned in the cartridge. At least the bottom portion of the cartridge defines a lower internal chamber located below the piston. The piston, the shaft and the control assembly cooperate to define a flow channel from the chamber through the piston, the shaft and the control assembly to the reservoir.

BRIEF DESCRIPTION OF THE DRAWINGS

The above mentioned and other features will now be described with reference to the drawings of preferred embodiments of the present suspension fork. The illustrated embodiments of the suspension fork are intended to illustrate, but not to limit the invention. The drawings contain the following figures.

DETAILED DESCRIPTION

Figure 1:
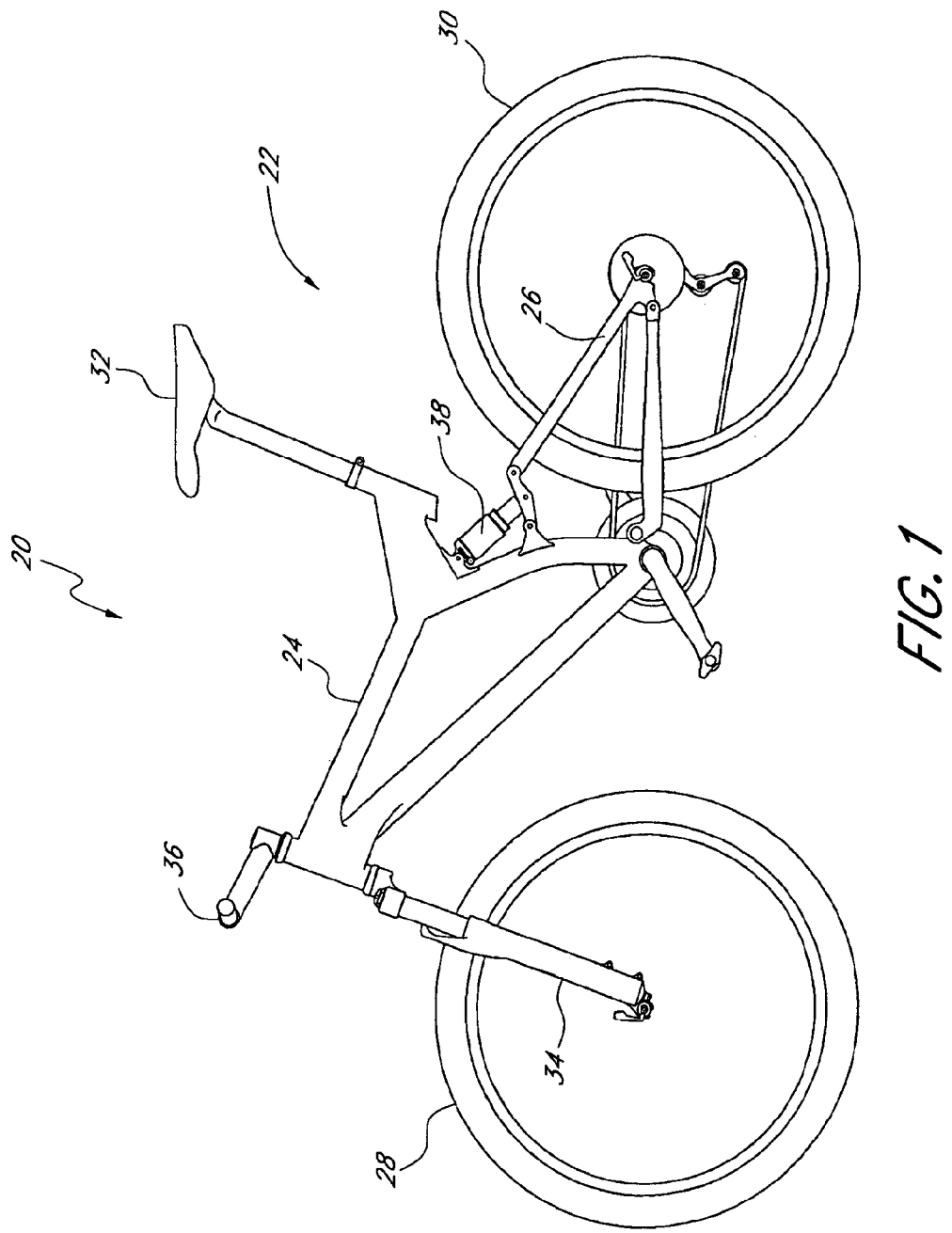
FIG. 1 is a perspective view of a bicycle having a preferred embodiment of a front wheel suspension fork.

FIG. 1 illustrates an off-road bicycle, or mountain bike 20, including a frame 22 which is comprised of a main frame portion 24 and a swing arm portion 26. The swing arm portion 26 is pivotally attached to the main frame portion 24. The bicycle 20 includes front and rear wheels 28, 30 connected to the main frame 24. A seat 32 is connected to the main frame 24 in order to support a rider of the bicycle 20.

The front wheel 28 is supported by a preferred embodiment of a suspension fork 34 which, in turn, is secured to the main frame 24 by a handlebar assembly 36. The rear wheel 30 is connected to the swing arm portion 26 of the frame 22. A rear shock 38 is positioned between the swing arm 26 and the frame 22 to provide resistance to the pivoting motion of the swing arm 26. Thus, the illustrated bicycle 20 includes suspension members between the front and rear wheels 28, 30 and the frame 22 which operate to substantially reduce wheel impact forces from being transmitted to the rider of the bicycle 20.

Figure 2:
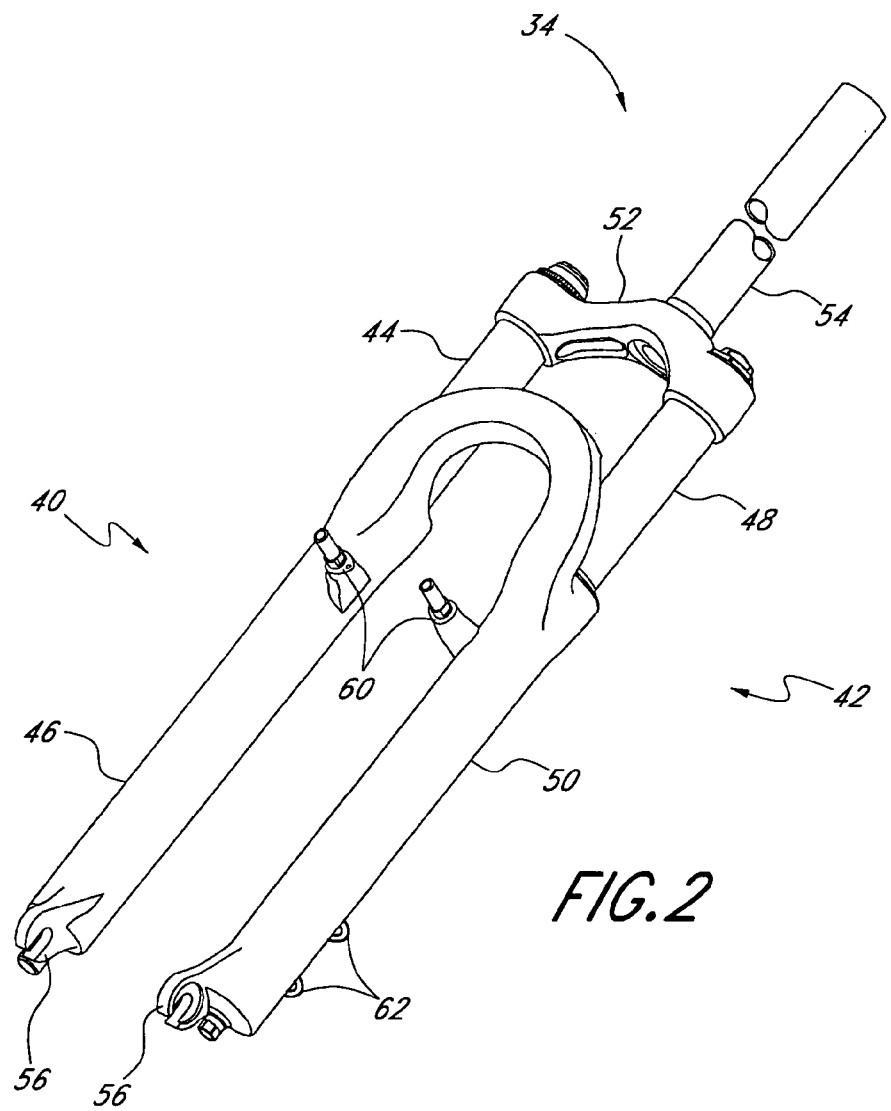
FIG. 2 is a perspective view of the suspension fork of FIG. 1, which is illustrated as removed from the bicycle.

FIG. 2 illustrates the suspension fork 34 detached from the bicycle 20 of FIG. 1. The suspension fork 34 includes right and left legs 40, 42, as referenced by a person in a riding position on the bicycle 20. The right leg 40 includes a right upper tube 44 telescopingly received in a right lower tube 46. Similarly, the left leg 42 includes a left upper tube 48 telescopingly received in a left lower tube 50. A crown 52 connects the right upper tube 44 to the left upper tube 48 thereby connecting the right leg 40 to the left leg 42 of the suspension fork 34. In addition, the crown supports a steerer tube 54, which passes through, and is rotatably supported by, the frame 22 of the bicycle 20. The steerer tube 54 provides a means for connection of the handlebar assembly 36 to the suspension fork 34, as illustrated in FIG. 1.

Each of the right lower tube 46 and left lower tube 50 includes a drop out 56 for connecting the front wheel 28 to the fork 34. An arch 58 connects the right lower tube 46 and the left lower tube 50 to provide strength and minimize twisting thereof. Preferably, the right lower tube 46, left lower tube 50 and the arch 58 are formed as a unitary piece, however, the tubes 46, 50 and arch 58 may be separate pieces and connected by a suitable fastening method.

The suspension fork 34 also includes a pair of rim brake bosses 60 to which a standard rim brake may be mounted. In addition, the fork 34 may include a pair of disc brake bosses 62 to which a disc brake may be mounted. Of course, the suspension fork 34 may include only one or the other of the rim brake bosses 60 and disc brake bosses 62, depending on the type of brake system desired.

Figure 3:
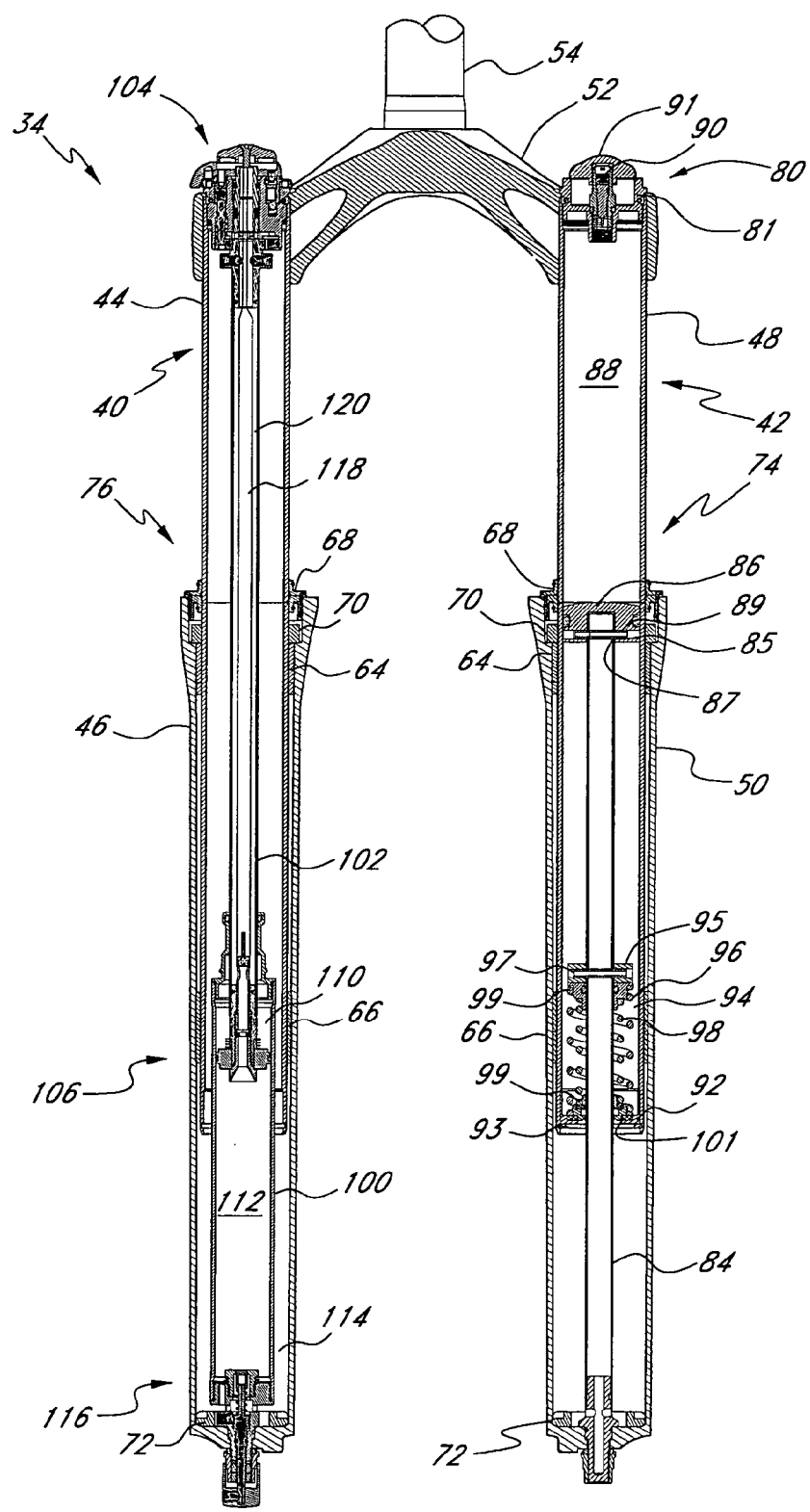
FIG. 3 is a cross-section of the suspension fork of FIG. 1, thus illustrating the internal components of the fork.

FIG. 3 is a cross-section view of the suspension fork 34 of FIG. 2 having the front portion cutaway to illustrate various internal components of the fork 34. As described previously, each of the upper tubes 44, 48 is capable of telescopic motion relative to its respective lower tube 46, 50. Each of the fork legs 40, 42 includes an upper bushing 64 and a lower bushing 66 positioned between the respective upper tubes 44, 48 and the lower tubes 46, 50. The bushings 64, 66 inhibit wear of the upper tubes 44, 48 and the lower tubes 46, 50 by preventing direct contact between the tubes. Preferably, the bushings 64, 66 are fixed to the respective lower tubes 46, 50 and are made from a self-lubricating and wear resistant material, as is known in the art. However, the bushings 64, 66 may be similarly fixed to the upper tubes 44, 48. Preferably, the bushings 64, 66 include grooves (not shown) which allow hydraulic fluid to pass between the bushings 64, 66 and the upper fork tubes 44, 48.

Each of the lower tubes 46, 50 have a closed lower end and an open upper end. Each of the upper tubes 44, 48 is received into a respective lower tube 46, 50 through its open upper end. A sealing arrangement is provided on each leg 40, 42 at the location where the upper tubes 44, 48 enter the open end of the lower tubes 46, 50. The sealing arrangement comprises a main seal 68, preferably disposed above a foam ring 70. The main seals 68 are supported by the lower tubes 46, 50 and are in sealing engagement with the upper tubes 44, 48 to substantially prevent oil from exiting, or foreign material from entering, the fork legs 40, 42 between the open end of the lower tubes 46, 50 and the upper tubes 44, 48. The foam rings 70 are supported by the lower tubes 46, 50 and are in engagement with the upper tubes 44, 48 to capture hydraulic fluid which passes upward between the upper bushings 64 and upper fork tubes 44, 48. The foam rings 70 then distribute the hydraulic fluid evenly onto the upper tubes 44, 48 which, in turn, lubricate the main seals 68.

Each of the fork legs 40, 42 includes a bottom-out bumper 72 disposed at the closed lower end of the lower tubes 46, 50. The bottom-out bumpers 72 serve to prevent direct contact between the upper tubes 44, 48 and the lower tubes 46, 50 when the fork 34 is in a fully compressed position. Accordingly, the bottom-out bumpers 72 are preferably made of an energy absorbing material, such as an elastomer or rubber.

The illustrated suspension fork 34 includes both a suspension spring assembly 74 and a damper assembly 76. The suspension spring assembly 74 provides resistance to compression of the fork 34 and releases energy stored during compression to cause the fork 34 to extend, or rebound. The damper assembly 76 provides a damping force which resists both compression and rebound motion, to slow the motion of the suspension fork 34 in either direction, as is known. Preferably, the damper assembly 76 is contained within the right leg 40 of the suspension fork 34, while the suspension spring assembly 74 is contained within the left leg 42.

The suspension spring assembly 74 comprises a spring cap assembly 80 which closes the upper end of the left upper tube 48. A seal 81 provides a preferably air and fluid-tight seal between the cap assembly 80 and the inner surface of the left upper tube 48. A spring piston rod 84 extends vertically upward from the closed lower end of the lower left fork tube 50 and supports a spring piston 86. The piston 86 includes a radial through-hole 85 which corresponds with a through-hole 87 in the piston rod 84. A pin 89 is press fit into the through-holes such that it engages the piston 86 on both sides of the piston rod 84 to secure the piston 86 thereto. The spring cap assembly 80 is fixed for movement with the left upper tube 48 and the spring piston 86 is fixed for movement with the left lower tube 50.

The spring piston 86 is in sealing engagement with the inner surface of the left upper tube 48. The cap assembly 80 and piston 86 define a positive air spring chamber 88 between them. A positive air valve 90 allows communication with the positive air spring chamber 88. A standard high pressure pump may be attached to the positive air valve 90 in order to pressurize the positive air spring chamber 88. Thus, when pressurized, the positive air spring chamber 88 acts as a suspension spring and exerts an extension force on the suspension fork assembly 34. A cap 91 is preferably threaded onto the valve 90 to provide protection from damage and keep foreign matter away from the valve 90.

A lower spring plate 92 is held within a counter bore of the upper fork tube 48 by a snap ring 93. An upper spring stop 95 is fixed in an axial position on the spring piston rod 84 by a pin 97, in a manner similar to the piston 86, as described above. A negative spring chamber 94 is defined between the lower spring plate 92 and upper spring stop 95. An outer negative spring 96 and an inner negative spring 98 are placed within the negative spring chamber 94. Preferably, the outer spring 96 and inner spring 98 are coil-type springs arranged concentrically with each other and with the spring piston rod 84. A pair of spring guides 99 assist in keeping the springs 96, 98 concentric with the piston rod 84 and from contacting the inner surface of upper tube 48 when compressed.

The spring plate 92 includes a central aperture 101 which provides clearance for the spring piston rod 84 to pass through. A small amount of lubricating fluid, preferably approximately 30 cc's of a suitable hydraulic damping fluid, is provided in the left fork leg 42 to lubricate the seal 68, bushings 64, 66, negative springs 96, 98 and spring guides 99.

Desirably, the outer negative spring 96 is of a greater length than the inner negative spring 98. Preferably, the spring rates of the outer and inner negative springs 96, 98 are selected such that the inner negative spring 98 is near its free-length when the suspension fork 34 is compressed by substantially only the weight of a rider of the bicycle 20. Although the illustrated negative spring assembly comprises a dual coil spring arrangement, a single negative spring may also be used. In addition, an air spring arrangement similar to the positive air spring chamber 88 may also be used in place of the coil-type negative spring arrangement.

As described above, the damper assembly 76 is preferably housed within the right leg 40 of the suspension fork 34. The damper assembly 76 is preferably an open-bath, cartridge-type damper having a cartridge tube 100 fixed to the closed lower end of the right lower tube 46 and extending vertically upward. A damper shaft 102 extends vertically downward from a damper cap assembly 104 and supports a rebound damping assembly 106 on its lower end. Thus, the rebound damping assembly 106 is fixed for movement with the right upper tube 44 while the cartridge tube 100 is fixed for movement with the right lower tube 46.

The rebound damping assembly 106 is positioned within the cartridge tube 100 and is in telescoping engagement with the inner surface of the cartridge tube 100. A cartridge tube cap 108 closes the upper end of the cartridge tube and is in sealing engagement with the damper shaft 102. Thus, the cartridge tube defines a substantially sealed internal chamber, which contains the rebound damping assembly 106.

The rebound damping assembly 106 divides the interior of the cartridge tube 100 into a rebound chamber 110 above the rebound damping assembly 106 and a compression chamber 112 below the rebound damping assembly 106. A reservoir 114 is defined between the outer surface of the cartridge tube 100 and the inner surfaces of the right upper and lower tubes 44, 46. A base valve assembly 116 allows selective communication between the compression chamber 112 and the reservoir 114.

The damper assembly 76 also includes a rebound adjust rod 118 which extends vertically downward from the damper cap assembly 104 within the central passage of the damper shaft 102. An upper compression passage 120 is defined between the rebound adjust rod 118 and the inner surface of the damper shaft 102. The upper compression passage 120 allows communication between the compression chamber 112 and the damper cap assembly 104, as will be described in detail below.

Figure 4:
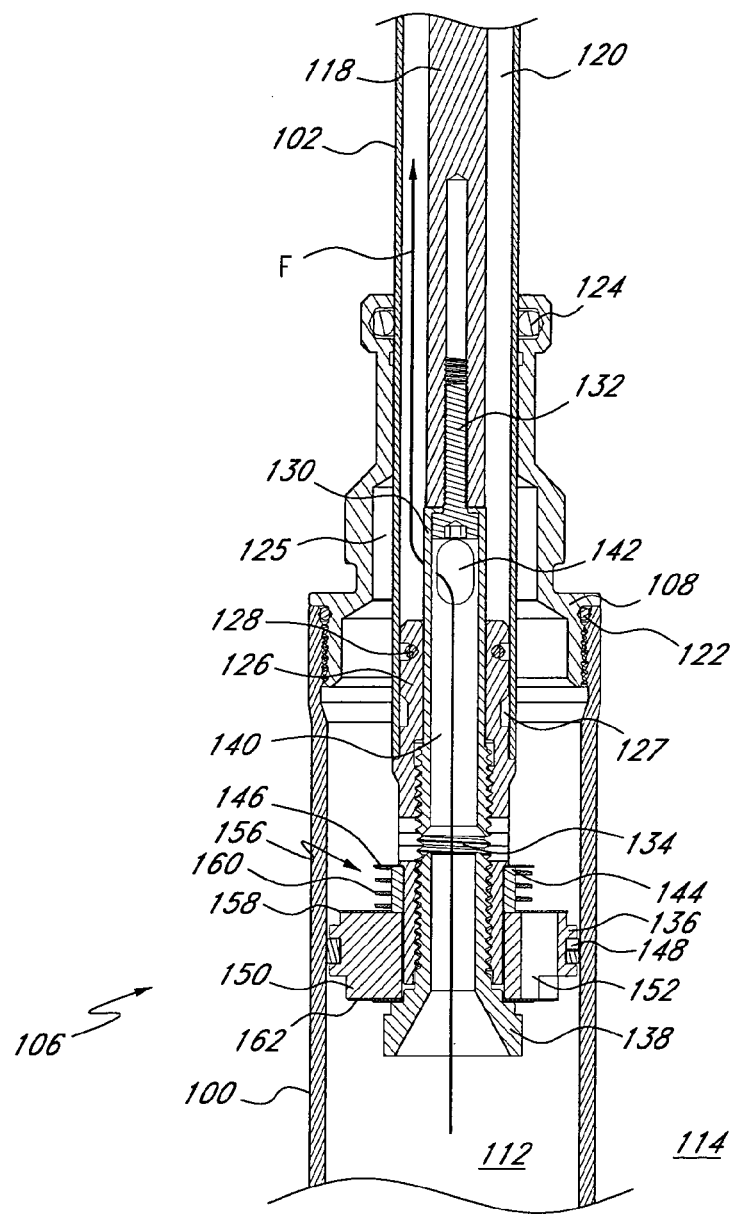
FIG. 4 is an enlarged cross-section illustrating the rebound damping circuit of the suspension fork of FIG. 1.

FIG. 4 is an enlarged cross-section of the rebound damping assembly 106. As described above, a cartridge tube cap 108 closes the cap end of the cartridge tube 100. An outer seal 122 creates a seal between the cartridge tube cap 108 and the cartridge tube 100 while an inner seal 124 creates a seal between the cartridge tube cap 108 and the damper shaft 102. Accordingly, extension and retraction of the damper shaft 102 is permitted while maintaining the rebound chamber 110 in a substantially sealed condition. The seals referred to herein may comprise O-rings or other suitable seals known to those of skill in the art. In addition, a bushing 125 is press fit into the cartridge tube cap 108 to prevent direct contact between the cap 108 and damper shaft 102.

A rebound piston support shaft 126 is fixed within the lower opening of the damper shaft 102 and includes a seal 128 to prevent fluid from passing there between. Preferably, the rebound piston support shaft 126 and the damper shaft 102 are connected by a roll-crimping method. Specifically, an annular recess 127 is provided on the outer surface of the support shaft 126. The damper shaft 102 is substantially cylindrical and is positioned on the support shaft 126 such that it overlaps the annular recess 127. A roll-crimping machine rotates the damper shaft 102 and support shaft 126 assembly while it mechanically deforms the damper shaft 102 material into the recess 127 (as illustrated in FIG. 4), thereby securing the support shaft 126 to the damper shaft 102. As roll-crimping is known in the art, further description is not deemed necessary in order to practice the invention. While a roll-crimping process is preferred, other suitable methods may also be used to join the support shaft 126 to the damper shaft 102.

A tubular piston rod extension 130 is fixed to the rebound adjust rod 118 by a threaded fastener 132. A lower portion of the piston rod extension 130 includes external threads which mate with internal threads of the rebound piston support shaft 126. Rotation of the rebound adjust rod 118 also rotates the piston rod extension 130 and results in axial movement of the piston rod extension 130 relative to the rebound piston support shaft 126. Upward axial movement of the damper shaft 102 uncovers a bleed port 134, which extends radially through the rebound piston support shaft 126, while downward axial movement of the damper shaft 102 covers the bleed port 134.

A rebound piston 136 is fixed to the lowermost end of the rebound piston support shaft 126 by a hollow piston bolt 138. The hollow passage of the piston bolt 138, along with the hollow passage of the piston rod extension 130 define a lower compression passage 140, which is in fluid communication with the compression chamber 112. The upper end of the piston rod extension 130 includes an aperture, or transfer port 142, which allows fluid communication between the upper compression passage 120 and the lower compression passage 140, as indicated by the arrow F in FIG. 4. Thus, fluid is able to flow from the compression chamber 112, through the lower compression passage 140 and upper compression passage 120, to the damper cap assembly 104.

A lower end of the rebound piston support shaft 126 includes a shoulder 144 which provides a support surface for a spacer 146. The spacer 146 engages the piston 136 to distance the piston 136 away from the shoulder 144. A rebound piston seal 148 creates a seal between the rebound piston 136 and the inner surface of the cartridge tube 100, thereby defining the rebound chamber 110 above the piston 136 and the compression chamber 112 below the rebound piston 136. The rebound piston 136 includes a compression port 150 and a rebound port 152 extending substantially axially through the radially outer portion of the rebound piston 136.

A check valve assembly 156 is arranged on the upper surface of the rebound piston 136 to selectively allow fluid communication from the compression chamber 112 to the rebound chamber 110 through the compression port 150. The check valve 156 includes a check plate 158 biased into an engagement with the upper surface of the piston 136 by a check spring 160. The check plate 158 is substantially annular in shape and capable of sliding axially with respect to the spacer 146. The check spring 160 is preferably a flat helical spring having a relatively low spring constant such that the spring 160 biases the check plate 158 into contact with the upper surface of the piston 136 to seal the compression port 150 during rebound motion, but easily compresses such that the check plate 158 moves away from the piston 136 to allow fluid flow through the compression port 150 in response to compression motion of the suspension fork 34.

A rebound shim stack 162 is secured to the lower surface of the rebound piston 136 by the piston bolt 138. The rebound shim stack 162 may a single shim, or a stack comprised of multiple shims, which are substantially annular in shape and made from a flexible spring steel, as is known in the art. The rebound shim stack 162 selectively allows fluid communication between the rebound chamber 110 and the compression chamber 112 through the rebound port 152. During compression motion of the suspension port assembly 34, the rebound shim stack 162 is engaged with the lower surface of the piston 136 to prevent fluid from flowing through the rebound port 152. During rebound motion of the suspension fork assembly 34, the rebound shim stack 162 acts as a diaphragm spring and flexes in response to a sufficient force of fluid pressure in the rebound chamber 110, to allow fluid flow through the rebound port 152 and into the compression chamber 112.

A bleed port 163 extends axially through the cartridge tube cap 108 between the seal 124 and the bushing 125. The bleed port 163 is sized such that air bubbles within the hydraulic fluid of the rebound chamber 110 can escape, without allowing an appreciable amount of fluid to pass there through. Advantageously, this construction prevents a loss of incompressibility of the fluid within the rebound chamber 110.

Figure 5:
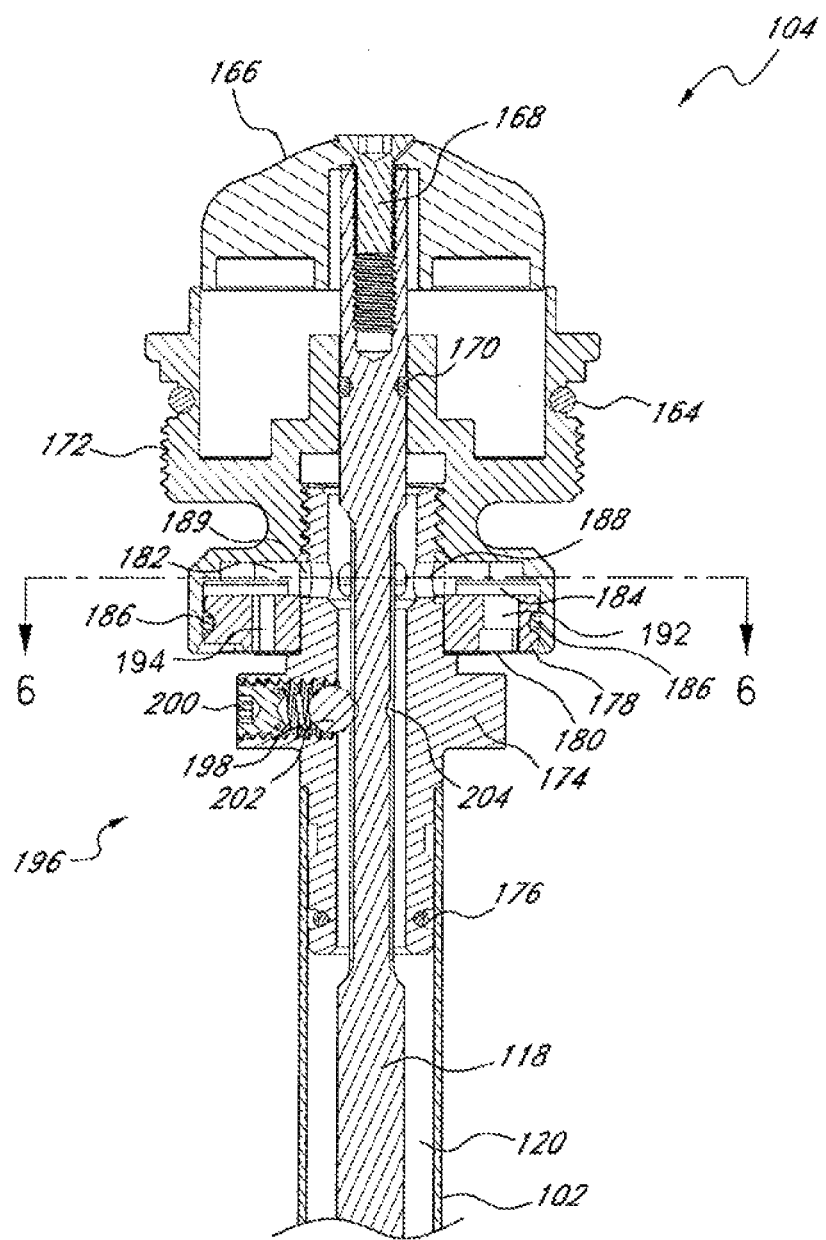
FIG. 5 is an enlarged cross-section of a rebound adjustment cap assembly of the suspension fork of FIG. 1.

FIG. 5 is an enlarged cross-section of the upper control assembly, or damper cap assembly 104. The suspension fork 34 of FIGS. 1-7 utilizes a damper cap assembly 104 including a rebound adjustment control, as will be described in detail below.

The rebound adjust rod 118 and damper shaft 102 extend downward from the damper cap assembly 104 and define the upper compression passage 120 between them. As also described above, the damper cap assembly 104 closes the upper end of the right upper tube 44. A cap seal 164 creates a seal between the damper cap assembly 104 and the inner surface of the right upper tube 44. The rebound adjust rod 118 extends upward through the center of the damper cap assembly 104 and is fixed for rotation with a rebound adjustment knob 166 by a threaded fastener 168. A rod seal 170 creates a seal between the rebound adjust rod 118 and a central passage of the damper cap assembly 104.

The damper cap assembly 104 is comprised primarily of a cap body 172 and a shaft support 174. The damper shaft 102 is roll-crimped to the shaft support 174 with a seal 176 preventing fluid flow there between. External threads on the upper portion of the shaft support 174 mate with internal threads of an internal channel of the cap body 172 and secure a compression piston 178 and compression shim stack 180 there between.

The shim stacks disclosed herein are preferably comprised of one or more annular shims, preferably made from thin steel, as is known to those of skill in the art. Each individual shim acts as a diaphragm spring which possesses an inherent spring rate when deflected about its central axis. As is known, a plurality of shims may be used to achieve a desired spring rate. The shims making up a single shim stack may vary in diameter, preferably with the largest diameter shim being located immediately adjacent the surface defining the ports through which the shim stack is controlling flow. For example, if a shim stack utilizing multiple diameter shims is used with the above-described damper cap assembly 104, preferably the largest diameter shim is located immediately adjacent lower surface of the compression piston 178.

The compression piston 178 is axially spaced from the cap body 172 by a shoulder 182 to create a compression chamber 184 between the upper surface of the piston 178 and the lower surface of the cap body 172. Preferably the shoulder 182 is integral with the cap body 172. A seal is created between the outer radial surface of the compression piston 178 and the cap body 172 by a piston seal 186.

Figure 6:
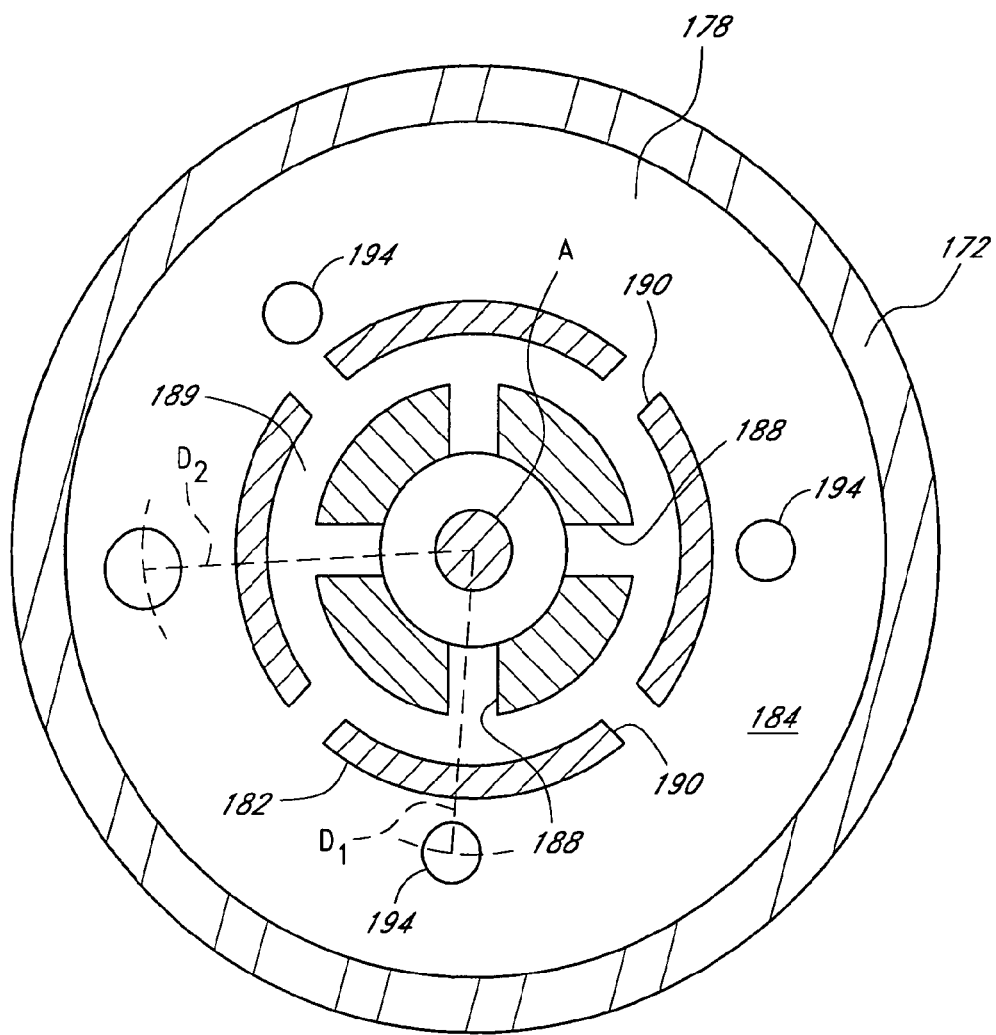
FIG. 6 is a cross-section of the cap assembly taken along the line 6-6 in FIG. 5.

With reference to FIGS. 5 and 6, the shaft support 174 includes radially extending ports 188 which allow fluid communication between the upper compression passage 120 and an annular transfer chamber 189 defined between the shaft support 174 and the shoulder 182. Radial passages in the shoulder 182 allow fluid communication between the transfer chamber 189 and the compression chamber 184. Thus, the radial ports 188 and radial passages 190 cooperate with the transfer chamber 189 to allow fluid communication between the upper compression passage 120 and the compression chamber 184. Advantageously, the transfer chamber 189 allows fluid communication between the radial ports 188 and radial passages 190 despite their relative angular positions. Thus, as illustrated in FIG. 6, it is not necessary that the radial ports 188 and radial passages 190 be aligned, because the transfer chamber 189 permits fluid flow to be directed there between. This feature enhances manufacturability and reduces cost because a threaded connection between the cap body 172 and shaft support 174 may be used.

The compression piston 178 includes a low speed compression port 192 and a plurality of mid-speed compression ports 194 passing axially there through. As illustrated in FIG. 6, the mid-speed compression ports 194 are disposed at a first radial distance D1 from a center axis A of the piston 178 while the low-speed compression ports are located a second radial distance D2 from the axis A. Preferably, the distance D1 is less than the distance D2. As a result, fluid flowing through the low speed compression port 192 has more leverage on the compression shim stack 180 in comparison to fluid flowing through the mid-speed compression port 194 and, accordingly, fluid flow is allowed through the low speed compression port 192 at a lower fluid pressure than is required to open the mid-speed compression ports 194. Advantageously, this arrangement provides separate low and mid-speed damping circuits, while remaining compact and without adding undesired weight.

One or more high-speed compression ports 195 (illustrated in phantom) may be provided and be of a smaller diameter or located a smaller radial distance D3 from the axis A, or a combination thereof, than the mid-speed compression ports 194. Such a construction would allow the high-speed compression ports to be relatively inactive at low and mid-speed shaft motion, while providing the primary damping force at high-speed shaft motion. Thus, it will be appreciated by one of skill in the art, that a plurality of port diameters and radial locations from the axis A may be used to achieve desired damping forces at specific shaft speeds. Also, as illustrated, a combination of ports may be used to provide varying damping forces over a range of shaft speeds.

With reference to FIG. 5, the damper cap assembly 104 also includes a ball detent assembly 196. The ball detent assembly 196 comprises a spring 198 placed between a set screw 200 and a ball bearing 202 to bias the ball bearing 202 into engagement with one of a plurality of recesses, or detents 204, formed on the rebound adjust rod 118. The spring rate of the spring 198 is selected such that the biasing force of the spring 198 may be easily overcome so that the rebound adjustment knob 166 may be turned by hand, while also providing positive feedback as to the relative position of the rebound adjust rod 118. Preferably, four (4) detents 204 are equally spaced around the circumference of the rebound adjust rod 118. Also, the rebound adjust rod 118 is desirably capable of rotating approximately three (3) revolutions between its upper position and its lower position. Accordingly, twelve (12) distinct rebound damping positions are defined by the rebound adjust rod 118 and the ball detent assembly 196.

Figure 7:
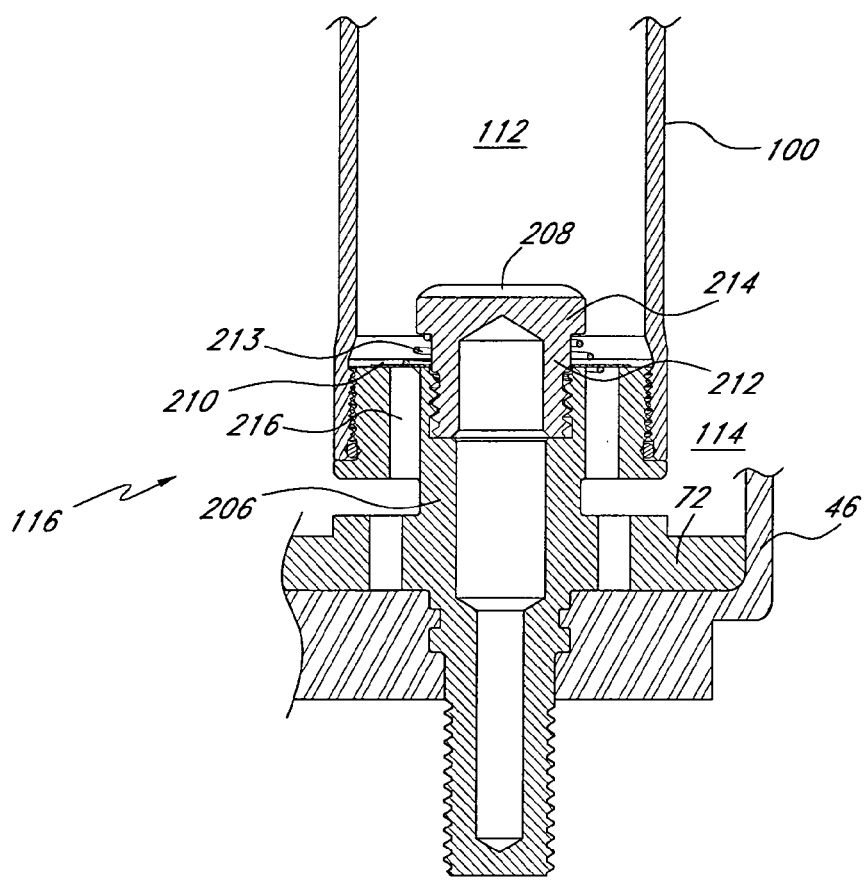
FIG. 7 is an enlarged cross-section of a base valve assembly of the suspension fork of FIG. 1.

FIG. 7 is an enlarged cross-section of the lower control assembly, or base valve assembly 116. The base valve assembly 116 allows selective communication between the reservoir 114 and the compression chamber 112. The base valve assembly 116 generally comprises a valve body 206, a shim bolt 208 and a check shim 210. A lower portion of the shim bolt 208 includes external threads which mate with internal threads of the base valve body 206. The shim bolt 208 includes a shaft portion 212 which centers the substantially annular check shim 210 with respect thereto. The shim bolt 208 also includes a shoulder portion 214 of larger diameter than the shaft portion 212 such that the check shim 210 is capable of limited axial movement between the upper surface of the base valve body 206 and a shoulder portion 214 of the shim bolt 208.

A check spring 213 biases the check shim 210 into engagement with the top surface of the base valve body 206. Preferably, the spring 213 is a conical coil spring having a low spring rate and small wire diameter so that it allows the check shim 210 to move easily away from the top surface of the base valve body 206. The small end of the spring 213 engages the base valve body 206 while the large end engages the check shim 210. Alternatively, a low axial travel shim without a spring may be used.

The radial outer portion of base valve body 206 also includes a plurality of refill ports 216 which pass axially there through. When the fluid pressure in the compression chamber 112 is greater than the fluid pressure in the reservoir 114, the check spring 213 keeps the check shim 210 engaged with the top surface of the base valve body 206, thus closing off the axial refill ports 216 and effectively preventing the flow of fluid there through. However, when the fluid pressure in the reservoir 114 is greater than the fluid pressure in the compression chamber 112, the check shim 210 moves away from the base valve body 206, against the small biasing force of the spring 213, to allow fluid flow from the reservoir 114 to the compression chamber 112, through the refill ports 216. Advantageously, the configuration and spring rate of the check spring 213 allows the check shim 210 to move easily away from the top surface of the base valve body 206 in order to prevent flow restriction which could result in cavitation, but also returns the check shim 210 quickly into engagement with the base valve body on compression movement of the fork 34.

The suspension fork assembly 34 described in relation to FIGS. 1-7 is capable of both compression, where the upper tubes 44, 48 and the lower tubes 46, 50 move closer together relative to each other and rebound, wherein the upper tubes 44, 48 and the lower tubes 46, 50 move farther apart in relation to each other. A fully compressed position is defined wherein the suspension fork 34 is compressed such that the lower-most surfaces of the upper tubes 44, 48 come to rest against the pair of bottom-out bumpers 72. A fully extended position is defined when the upper tubes 44, 48 are retracted from the lower tubes 46, 50 such that the outer and inner negative springs 96, 98 are fully compressed between the negative spring chamber seal 92 and the spring piston 86.

A ride height of the suspension fork assembly 34 is defined as the relative position between the upper tubes 44, 48 and the lower tubes 46, 50 when the suspension fork 34 is bearing the weight of a rider of the bicycle 20, with substantially no other external forces being present. As mentioned above, the ride height is preferably such that the inner negative spring 98 is substantially near its free length, or its uncompressed length, when no other external force is exerted on the spring. The ride height can be adjusted to suit riders of different weights by tuning the positive air spring chamber 88 and/or the outer and inner negative springs 96, 98. Air can be added or removed from the positive air spring chamber 88 to adjust the pressure therein. The free length and/or spring rate of the outer and inner negative springs 96, 98 may also be selected to achieve the desired ride height.

When the suspension fork 34 is in compression, such as when the front wheel 28 of the bicycle 20 encounters a bump, the air within the positive air spring chamber 88 functions as an air spring to progressively resist compression of the upper tubes 44, 48 into the lower tubes 46, 50. The outer and inner negative springs 96, 98 exert a compressive force on the suspension fork 34 and thereby assist the initial compressive motion between the upper tubes 44, 48 and the lower tubes 46, 50. Advantageously, with such a construction, the negative springs 96, 98 help to overcome any static friction present in the suspension fork 34, due to the bushings and various seals, in order to allow initial compression with a minimal force input.

With reference to FIGS. 3-7, the above-described damper assembly 76 includes various flow paths which provide damping to the motion of the suspension fork 34 in both a compression and a rebound direction. The various flow paths can be generally categorized into compression circuits and rebound circuits. Of course, some passages may be utilized for both compression and rebound fluid flow. Desirably, the damper assembly 76 includes a sufficient volume of a suitable damping fluid such that at least the entire cartridge tube 100, upper and lower compression passages 120, 140 and damper cap assembly 104 may be filled, and enough damping fluid remains in the reservoir 114 to cover the refill ports 216 of the base valve assembly 116.

During compression motion of the suspension fork 34, the rebound piston 136 moves downward in relation to the cartridge tube 100 and, as a result, the fluid pressure within the compression chamber 112 increases. In response to the increased pressure in the compression chamber 112, hydraulic fluid contained therein passes through the check valve assembly 156 of the rebound piston 136 to the rebound chamber 110. As described above, the check spring 160 that biases the check plate 158 against the top surface of the rebound piston 136 desirably has a low spring rate and therefore offers little resistance to fluid flow through the compression ports 150. Thus, fluid flow from the compression chamber 112 to the rebound chamber 110 through the check valve 156 serves primarily to fill the rebound chamber 110 and, desirably, provides little damping force.

Also in response to the increased pressure in the compression chamber 112, fluid flows in an upward direction from the compression chamber 112 into the lower compression passage 140. A portion of the fluid flows from the lower compression passage 140 through the bleed port 134 and into the rebound chamber 110. As with the flow of fluid through the check valve 156, the flow of fluid through the bleed port 134 serves primarily to fill the rebound chamber 110 and, preferably, does not provide a substantial damping force.

The remainder of the fluid continues to flow upward in the lower compression passage 140 and into the upper compression passage 120 through the transfer port 142. With reference to FIG. 5, the flow of fluid continues to travel upward through the upper compression passage 120 and into the damper cap assembly 104. The flow of fluid then travels through both the radial port 188 of the shaft support 174 and the radial passage 190 of the piston shoulder 182 and into the compression chamber 184, thus increasing the fluid pressure therein.

As described above, because the low speed compression port 192 is positioned further radially outward in comparison to the plurality of mid-speed compression ports 194, the compression shim stack 180 is deflected from the lower surface of the compression piston 178 at lower fluid pressures than is necessary to deflect the shim stack 180 to open the mid-speed compression ports 194. Thus, the primary damping force is provided by the flow through the low speed compression port 192 which is resisted by the compression shim stack 180 at low fluid pressures which correspond with low speed compressive motion.

As the compressive motion speed increases and therefore, fluid pressure within the compression chamber 184 increases, sufficient fluid pressure is created to deflect the compression shim stack 180 such that fluid is able to flow through the mid-speed compression ports 194. At these compression speeds, the primary damping force as provided by the fluid flow through the mid-speed compression ports 194 which is resisted by the compression shim stack 180.

Hydraulic fluid that exits through either the low speed or mid-speed compression ports 192, 194 flows downward, due to gravity, to fill the lower portion of the reservoir 114. In addition, because the damper assembly 76 is an open bath system, hydraulic fluid within the reservoir 114 is also able to move throughout the reservoir 114 and, advantageously, provides lubrication for the bushings 64, 66 and various seals within the damper assembly 76.

On rebound motion of the suspension fork 34, the rebound piston 136 moves in an upward direction with respect to the cartridge tube 100, thereby increasing the pressure in the rebound chamber 110. In response to the increase in fluid pressure within the rebound chamber 110, fluid flows through the bleed port 134 and downward through the lower compression passage 140 and then to the compression chamber 112. As described above, the rebound adjustment knob 166 may be rotated to in turn rotate the rebound adjust rod 118 and cause the piston rod extension 130 to increase or decrease the exposed portion of the bleed port 134. In this manner, the damping force provided by the restricted flow of fluid through the bleed port 134 may be adjusted. Advantageously, because the rebound adjustment knob 166 is disposed on the damper cap assembly 104, it may be easily manually adjusted by the rider of the bicycle 20, even while riding. In addition, no tools are necessary to change the damping rate and such adjustment may be made externally, without requiring disassembly of the suspension fork 34.

Also in response to the increased pressure with the rebound chamber 110, fluid flows through the rebound port 152 and, if the fluid pressure is greater than a predetermined threshold, deflects the rebound shim stack 162 away from the bottom surface of the rebound piston 136 to allow fluid to flow from the rebound chamber 110 to the compression chamber 112. Rebound damping force is provided by the rebound shim stack 162 against the flow of fluid through the rebound port 152.

The suspension fork 34 additionally includes a refill feature which operates to refill the compression chamber 112 during rebound motion. During rebound, the compression shim stack 180 within the damper cap assembly 104 creates a substantially air-tight seal with the lower surface of the compression piston 178. As a result, the low pressure condition in the compression chamber 112 is not able to suction fluid from within the upper compression passage 120. This ensures that the upper compression passage 120 and damper cap assembly 104 remain filled with fluid. Advantageously, the upper compression passage 120 and compression chamber 184 do not have to be refilled upon subsequent compression motion of the suspension fork 34 before producing a damping force. In addition, upon extension and, therefore, upward movement of the rebound piston 136 relative the cartridge tube 100, the seal between the compression shim stack 180 and the compression piston 178 serves to draw fluid from the reservoir 114 and into the compression chamber 112 through the base valve assembly 116.

Figure 8:
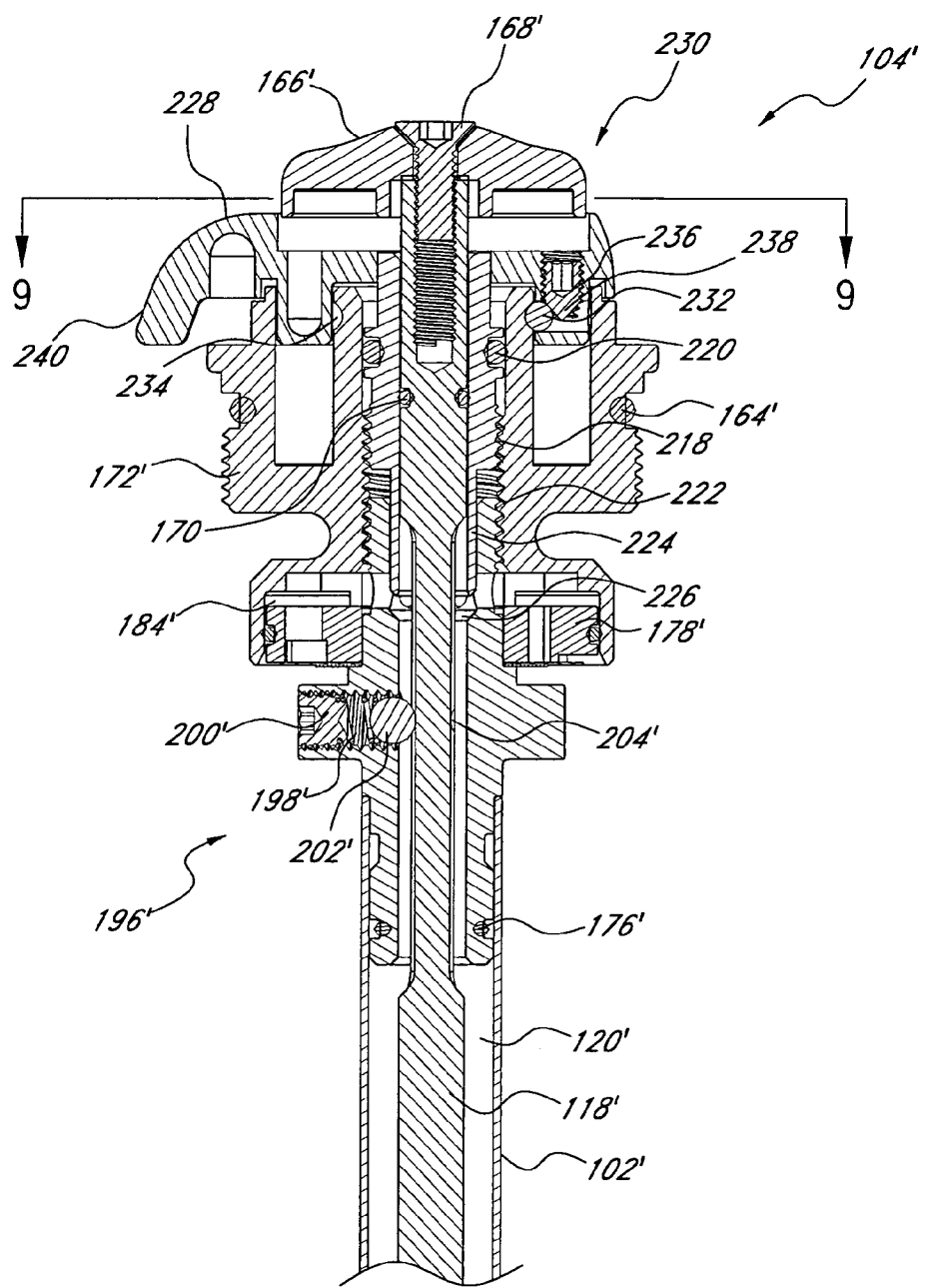
FIG. 8 is an enlarged cross-section of a rebound adjustment and lock-out cap assembly of a second embodiment of a suspension fork.
Figure 9:
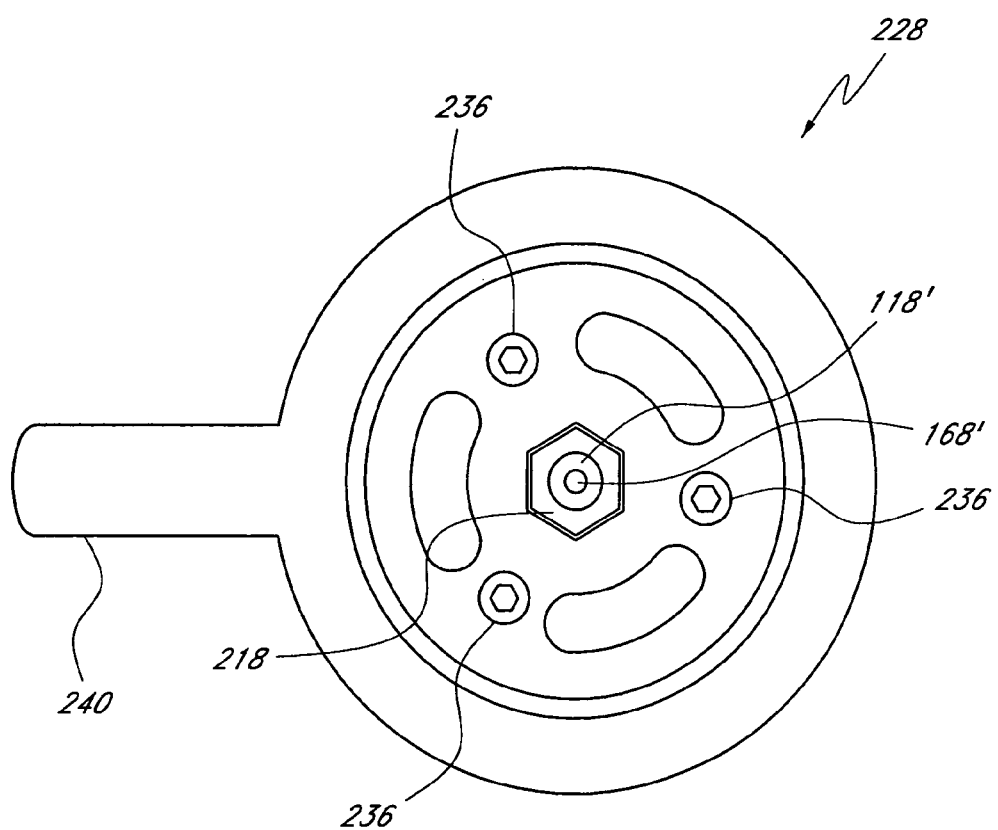
FIG. 9 is a cross-section of the cap assembly of FIG. 8, taken along the line 9-9 in FIG. 8.
Figure 10:
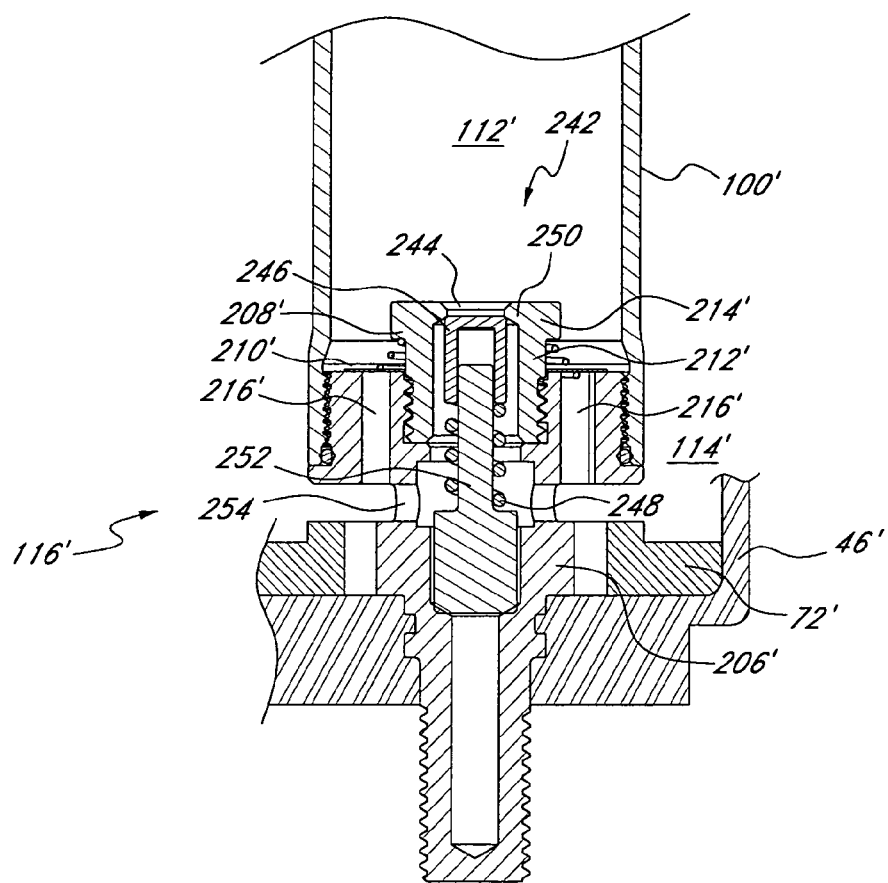
FIG. 10 is a cross-section of a base valve assembly of the second embodiment.
Figure 11:
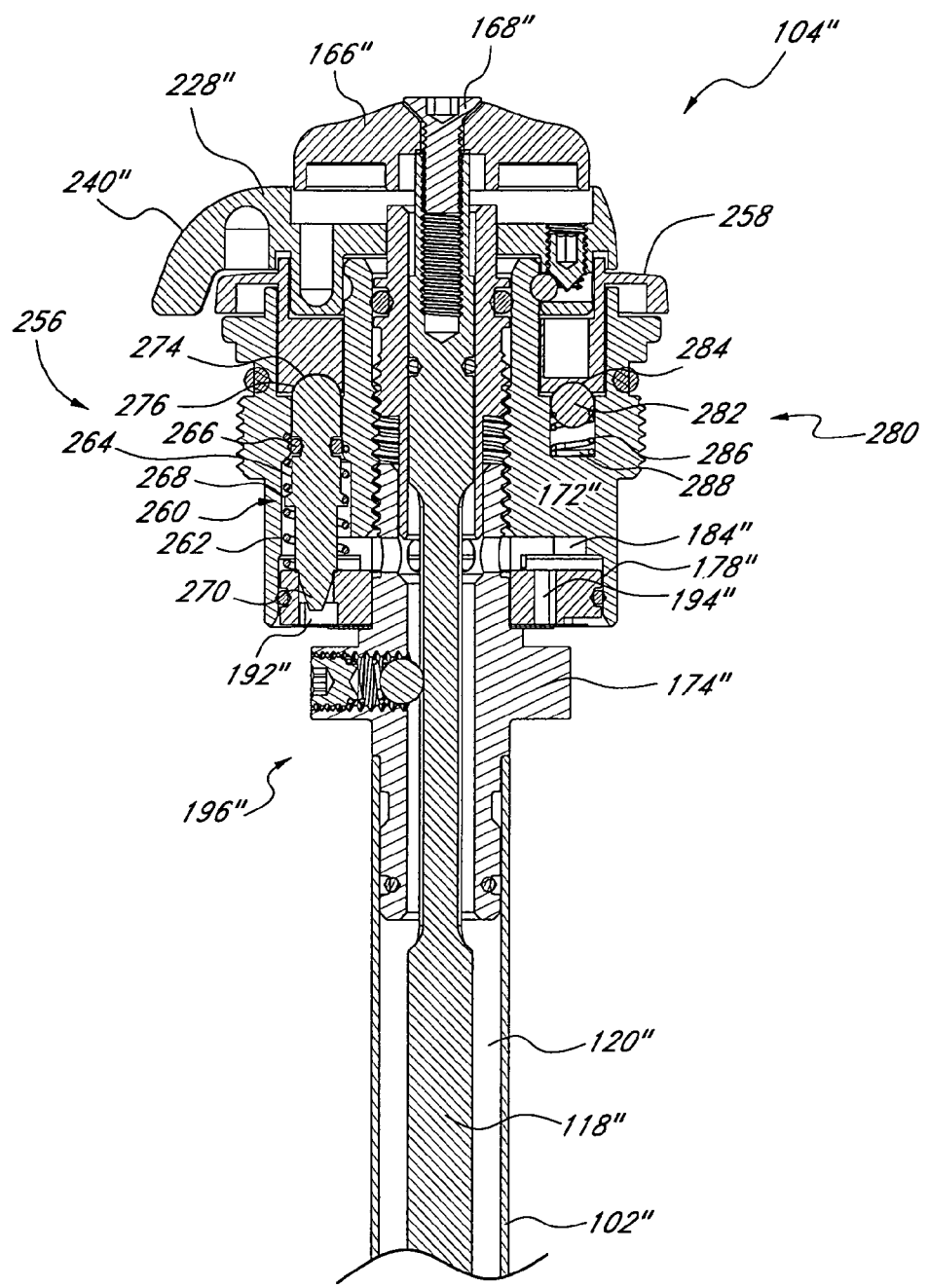
FIG. 11 is a cross-section of a rebound adjustment, low speed compression adjustment and lock-out cap assembly of a third embodiment of a suspension fork.
Figure 12:
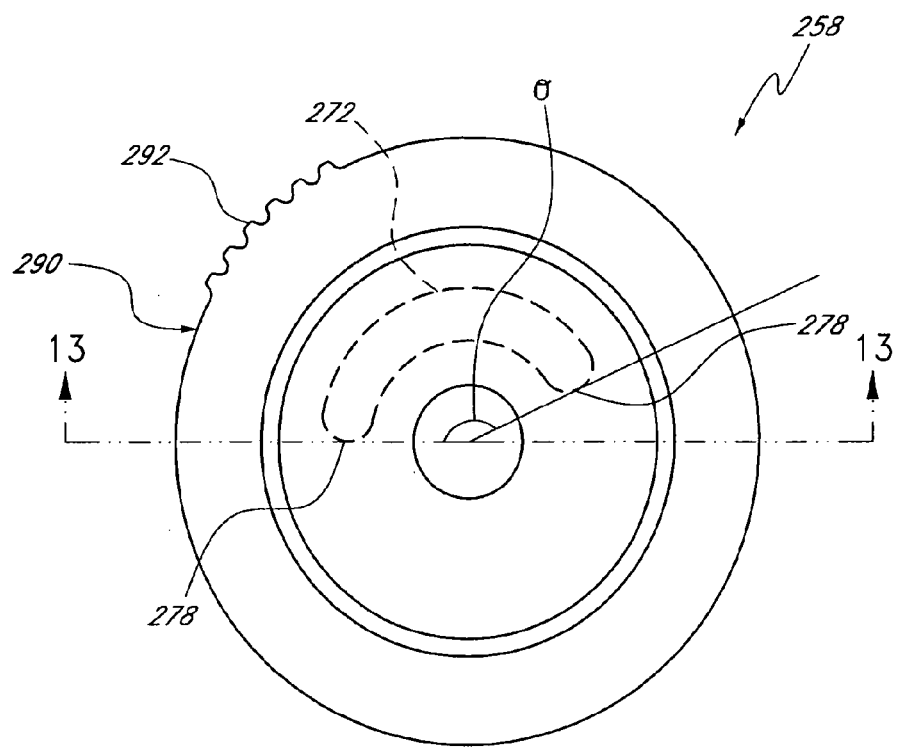
FIG. 12 is a top view of a low-speed compression adjustment knob of the cap assembly of FIG. 11.
Figure 13:
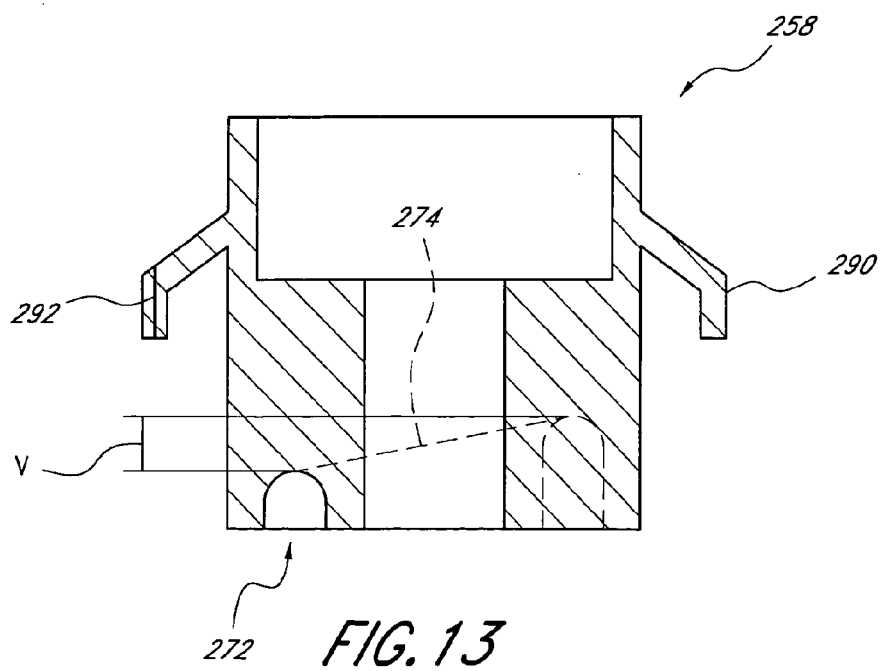
FIG. 13 is a cross-section of the low-speed compression adjustment knob of FIG. 12, taken along the line 13-13 of FIG. 12.

FIGS. 8-10 illustrate relevant portions of an alternative embodiment of a suspension fork, generally indicated by the reference character 34'. Suspension fork 34', in addition to having an adjustable rebound damping circuit, features a high-speed compression circuit (or blow-off) and a low/mid-speed compression lock-out. In most other respects, suspension fork 34' is similar in both construction and function to the suspension fork 34 of FIGS. 1-7. Accordingly, like components will be indicated with like reference numerals, except that a (') will be added.

With reference to FIG. 8, the central passage of the cap body 172' is increased in diameter to accommodate a lock-out cylinder 218 positioned between the cap body 172' and the rebound adjust rod 118'. A seal 220 provides a substantially fluid and air-tight seal between the lock-out cylinder 218 and the inner surface of the central passage of the cap body 172'. Additionally, cap seal 164' provides a seal between the rebound adjust rod 118' and the inner surface of a central passage of the lock-out cylinder 218, rather than between the rebound adjust rod 118 and the cap body 172, as in the previous embodiment.

The lock-out cylinder 218 includes a externally threaded portion 222 which mates with the internal threads of the cap body 172'. Accordingly, rotation of the lock-out cylinder 218 results in corresponding axial movement of the lock-out cylinder 218 with respect to the cap body 172'. Preferably, the mating threads of the cap body 172' and the lock-out cylinder 218 are 10 mm diameter by 1 mm pitch, double-start threads. With such a construction, relatively large axial motion is achieved with a relatively small degree of rotation of the lock-out cylinder 218.

A blocking sleeve 224 extends in a downward direction from, and is preferably unitary with, the lock-out cylinder 218. The blocking sleeve 224 is configured to selectively allow fluid to pass, or substantially prevent fluid from passing, from the upper compression passage 120' to the compression chamber 184'. The lower end of the blocking sleeve 224 is configured to mate with a blocking sleeve seat 226 of the shaft support 174'.

An upper-most, or "open", position of the lock-out cylinder 218 is defined when the blocking sleeve 224 is retracted such that the radial ports 188' of the shaft support 174' and the radial passages 190' of the piston shoulder 182' are substantially fully open, thereby allowing fluid to flow from the upper compression passage 120' to the compression chamber 184' (reference FIG. 6). Conversely, a lower-most, or "closed", position of the lock-out cylinder 218 is defined when the blocking sleeve 224 is advanced such that the radial ports 188' and radial passages 190' are substantially fully closed, thereby substantially prohibiting the flow of fluid from the upper compression passage 120' to the compression chamber 184'. Desirably, the lock-out cylinder 218 moves between its open and closed positions with less than one revolution, preferably, with less than one-half revolution and, most preferably, with less than one-third revolution. The lock-out can be actuated more quickly and easily by the rider when the amount of rotation between the open and closed position is relatively small.

With reference to FIGS. 8 and 9, a lock-out knob 228 is engaged with the upper portion of the lock-out cylinder 218 and is supported for rotation on the cap body 172' by a ball bearing arrangement 230. A plurality of ball bearings 232 travel within an annular recess 234 (FIG. 8) defined by the cap body 172' and are secured in recess 234 by a plurality of set screws 236. The set screws 236 each have a substantially cone-shaped lower end 238 which engages one of the plurality of ball bearings 232. Thus, the lock-out knob 228 is secured in an axial position with respect to the cap body 172' while being capable of rotation with respect thereto.

As described above, the lock-out cylinder 218 engages the upper portion of the lock-out knob 228. As illustrated in FIG. 9, the mating portions of the lock-out cylinder 218 and the lock-out knob 228 each have a hex-shaped cross-section thereby fixing the lock-out cylinder 218 for rotation with the lock-out knob 228. Simultaneously, the lock-out cylinder 218 is able to move axially with respect to the lock-out knob 228 by sliding motion between the hex-shaped cross-sections.

The lock-out knob 228 also includes a lever portion 240 which provides a convenient surface for a rider of the bicycle 20 (FIG. 1) to grasp in order to rotate the lock-out knob 228. The lever portion 240 also provides a leverage advantage to increase the ease with which the lock-out knob 228 may be rotated.

With reference to FIG. 10, a preferred base valve assembly 116' for use in conjunction with the damper cap assembly 104' described immediately above. In addition to the refill function of the base valve assembly 116 of the suspension fork 34 of FIGS. 1-7, the present base valve assembly 116' includes a blow-off circuit 242. The blow-off circuit 242 selectively allows fluid flow from the compression chamber 112' to the reservoir 114' at high compressive fluid pressures or shaft speeds. Preferably, the blow-off circuit 242 remains closed at compressive fluid pressures below the threshold necessary to open the low and mid-speed compression circuits of the suspension fork 34'.

The blow-off compression circuit 242 generally comprises a valve opening 244, a blow-off piston 246 and a blow-off spring 248. The valve opening 244 is defined by a central passage of the shim bolt 208' and includes a blow-off piston seat 250. The blow-off spring 248 is supported on a spring support shaft 252 and biases the blow-off piston into engagement with the blow-off piston seat 250 to substantially prevent fluid from passing through the valve opening 244 at fluid pressures below a predetermined threshold. This threshold is determined by a combination of the spring rate of the blow-off spring 248, the preload on the spring 248 and the area of the blow-off piston 246 that is subject to fluid pressure from the compression chamber 112. When fluid pressure in the compression chamber 112' is above the predetermined threshold, the piston 246 is forced away from the piston seat 250 and allows fluid to flow through the valve opening 244 and through radial ports 254 in the base valve body 206' into the reservoir 114', thus lowering the pressure within the compression chamber 112.

When the lock-out knob 228 is positioned such that the lock-out cylinder 218 is at closed position, the flow of hydraulic fluid is prevented through the low, mid and high-speed compression circuits and the suspension fork 34' is in a locked-out state, where substantially no relative motion is permitted between the upper fork tubes 44, 48 and the lower fork tubes 46, 50 (FIG. 2). Advantageously, this prevents rider pedal energy from being absorbed by the suspension fork 34 thereby allowing such energy to instead promote forward motion of the bicycle 20 (FIG. 1). If a large bump is encountered, such that the pressure within the compression chamber rises above the threshold necessary to open the blow-off valve 242, the valve 242 operates to allow fluid flow from the compression chamber 112' to the reservoir 114'. Advantageously, this prevents damage to the various seals of the suspension fork 34' and prevents the entire force of the bump from being transferred to the rider.

The placement of the lock-out knob 228 on the damper cap assembly 104' allows easy access to the rider of the bicycle 20 (FIG. 1), even while riding. This is advantageous because a wide variety of terrain may be encountered in a single ride such that "on-the-fly" (while riding) actuation of the lock-out knob 228 is highly desirable. Furthermore, because the low, mid and high-speed compression circuits are locked-out within the damper cap assembly 104', the lock-out cylinder 218 remains mechanically simple and compact, thereby decreasing the likelihood of failure, saving weight and reducing the cost of manufacture in comparison to lock-out assemblies located in the middle or lower region of the fork leg, which often require complex actuation mechanisms.

FIGS. 11-14 illustrate relevant portions of another embodiment of a suspension fork, generally indicated by the reference character 34". Suspension fork 34", in addition to having an adjustable rebound damping circuit, a blow-off circuit and a low/mid-speed compression lock-out of the previously described suspension forks 34, 34', respectively, includes adjustable low-speed compression damping and blow-off pressure. In most other respects, suspension fork 34" is similar in both construction and function to the suspension fork 34 and 34' of FIGS. 1-7 and 8-10, respectively. Accordingly, like components will be indicated with like reference numerals, except that a (") will be added.

The damper cap assembly 104" includes a low-speed compression damping adjustment assembly 256, which generally comprises a low-speed compression adjustment knob 258, an adjustment needle 260 and a needle spring 262. The adjustment needle 260 is supported for axial movement within a needle aperture 264, which extends axially through the cap body 172", and above the low speed compression port 192". A seal 266 provides a seal between the adjustment needle 260 and the cap body 172".

The adjustment needle 260 includes an annular flange, or needle stop 268, which interferes with the cap body 172" to define the upper most position of the adjustment needle 260 with respect to the compression piston 178". In its uppermost position, a lower tapered end 270 of the adjustment needle 260 preferably does not substantially interfere with fluid flow through the low-speed compression port 192". The needle stop 268 also functions as an engagement surface for the needle spring 262, which is positioned between the needle stop 268 and the upper surface of the compression piston 178" to bias the adjustment needle 260 into its uppermost position. A lowermost position of the adjustment needle 260 is defined when the needle 260 is force in a downward direction, overcoming the biasing force of the needle spring 262, by the low-speed compression knob 258, as will be described below. In its lowermost position, the tapered end 270 of the needle 260 is positioned within the low-speed compression port 192" to substantially inhibit fluid flow there through. In this manner, the damping force at low shaft speeds is increased. If desired, the needle 260 may be configured to seat with the low-speed compression port 192" in its lowermost position, thereby effectively preventing fluid flow through the low-speed compression port 192".

The low speed compression adjustment knob 258 is positioned between the lock-out knob 228" and the cap body 172" for rotation with respect to the cap body 172". The adjustment knob 258 engages the adjustment needle 260 to move the needle 260 between its uppermost and lowermost positions. The adjustment knob 258 includes an arcuate needle adjustment channel 272 (FIGS. 12 and 13), which extends radially about a central axis of the adjustment knob 258 for a specified angle .theta. Desirably, the angle is between 90 and 180.degree. Preferably, the angle is approximately 144.degree. This range provides a desirable amount of adjustment while keeping the rotation of the adjustment knob 258 small enough to be comfortable to actuate while riding.

The upper surface of the channel 272 defines a needle ramp surface 274, which is inclined relative to the upper surface of the compression piston 178". An engagement surface 276 (FIG. 11), defined by the upper portion of the adjustment needle 260, engages the ramp surface 274 of the adjustment knob 258 such that rotation of the adjustment knob 258 moves the adjustment needle 260 substantially between its uppermost and lowermost positions. Each end of the channel 272 defines a stop surface 278, which interferes with the upper end of the adjustment needle 260 to define the limits of the range of motion for rotation of the adjustment knob 258. Preferably, a vertical distance V (FIG. 13) between the shallowest end of the ramp surface 274 and the deepest end of the ramp surface 274 is approximately 0.10 inches. Accordingly, the height of the tapered end 270 of the adjustment needle 260 varies by 0.10 inches with respect to the upper surface of the compression piston 178" when the adjustment knob 258 is rotated through its full range of motion.

The adjustment knob 258 additionally includes a ball detent mechanism 280, which is similar in both structure and operation to the detent mechanism 196" associated with the rebound adjust rod 118". The ball detent mechanism 280 includes a ball bearing 282 which is biased into engagement with one of a plurality of detents 284, defined by the adjustment knob 258, by a spring 286. Both the ball bearing 282 and the spring 286 are contained within a spring pocket 288, which is defined by the cap body 172". Preferably, nine (9) detents are provided throughout the range of motion of the adjustment knob 258, thereby providing nine (9) positive reference positions, which define individual settings of the low-speed compression adjustment assembly 256.

The adjustment knob 258 also includes an annular flange which defines a finger grip portion 290. The outer peripheral surface of the finger grip portion 290 includes a plurality of recesses 292, which preferably extend entirely around the finger grip portion 290. The recesses 292 provide an interrupted surface, which permits the adjustment knob 258 to be easily rotated, even in muddy or wet conditions.

Advantageously, the construction of the damper cap assembly 104" allows the level of low-speed compression damping to be adjusted externally, without necessitating disassembly of the suspension fork 34". In addition, the level of low-speed compression damping may be adjusted on-the-fly. This provides an important advantage if the terrain conditions change over the course of a ride, or race, or if it turns out that the initial setting was less than desirable.

Figure 14:
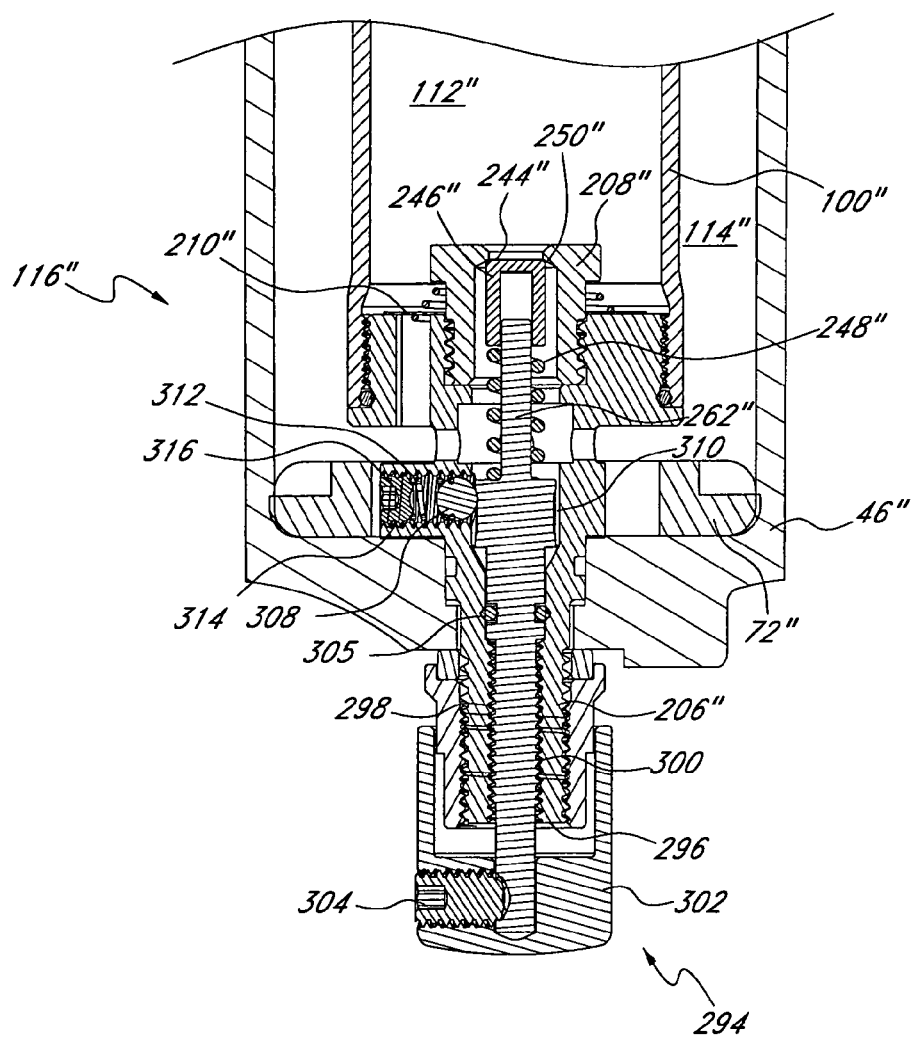
FIG. 14 is a cross-section of a blow-off adjustment base valve assembly of the third embodiment.

With reference to FIG. 14, a preferred base valve assembly 116" is illustrated for use in conjunction with the damper cap assembly 104" described immediately above. In addition to the refill function and the blow-off circuit 242, the present base valve assembly 116" of FIG. 14 includes a blow-off adjustment assembly 294.

To provide the capability of adjusting the blow-off circuit, the blow-off spring support shaft 262" extends through an open end 296 of the base valve body 206". The support shaft 262" includes an externally threaded portion 298, which mates with internal threads 300 of the base valve body 206". With this construction, rotation of the blow-off spring support shaft 262" is converted to axial movement of the support shaft 262" in relation to the base valve body 206". Axial movement of the support shaft 262" varies the relaxed length of the blow-off spring 248", and thereby varies the preload on the spring 248". The preload of the blow-off spring 248" influences the threshold fluid pressure within the compression chamber 112" which is necessary to open the blow-off valve 242". More preload raises the threshold pressure, while less preload decreases the threshold pressure.

A blow-off adjustment knob 302 is secured to the lower, exposed end of the support shaft 262" by a set screw 304. The adjustment knob 302 allows the support shaft to be rotated easily by hand. A seal 305 creates a seal between the support shaft 262" and the base valve body 206" to substantially inhibit fluid from passing there between.

The blow-off adjustment assembly 294 also includes a ball detent assembly 306, which is similar to the ball detent assemblies described above. The ball detent assembly 306 includes a ball bearing 308 biased into engagement with a detent 310 defined by the support shaft 262" by a spring 312. The ball bearing 308 and spring 312 are secured within a cavity 314 by a set screw 316. Preferably, four (4) detents 310 are provided and the support shaft 262" is capable of making three (3) revolutions, thereby defining twelve (12) blow-off damping adjustment positions.

Advantageously, the suspension fork 34" described immediately above provides a wide range of both compression and rebound adjustment. Low-speed compression, rebound damping, blow-off pressure, as well as a compression lock-out feature, may all be accessed, and adjusted, externally and without the use of any tools. In addition, the low-speed compression and rebound damping circuits, and lock-out, controls are conveniently located on the upper portion of the suspension fork 34". As a result, "on-the-fly" access to the above-mentioned controls is provided, thereby permitting damping adjustment and actuation of the lock-out feature while the bicycle 20 (FIG. 1) is being ridden. Such a construction provides a distinct advantage by allowing initial damping settings to be adjusted, and the lock-out feature actuated, during the course of a ride or race.

Figure 15:
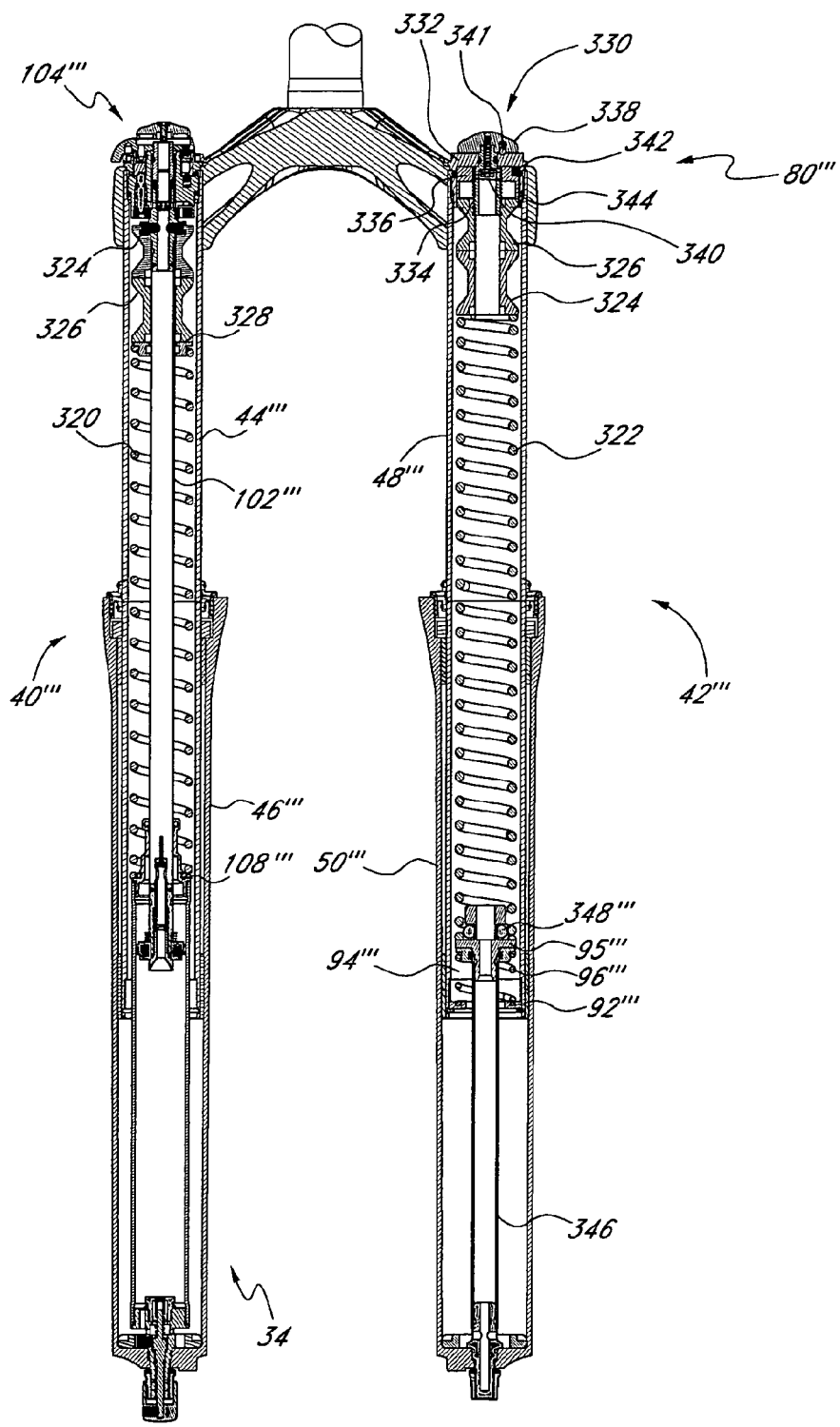
FIG. 15 is a cross-section of a coil-sprung embodiment having a coil spring in each leg for providing an expansion force on the fork.
Figure 16:
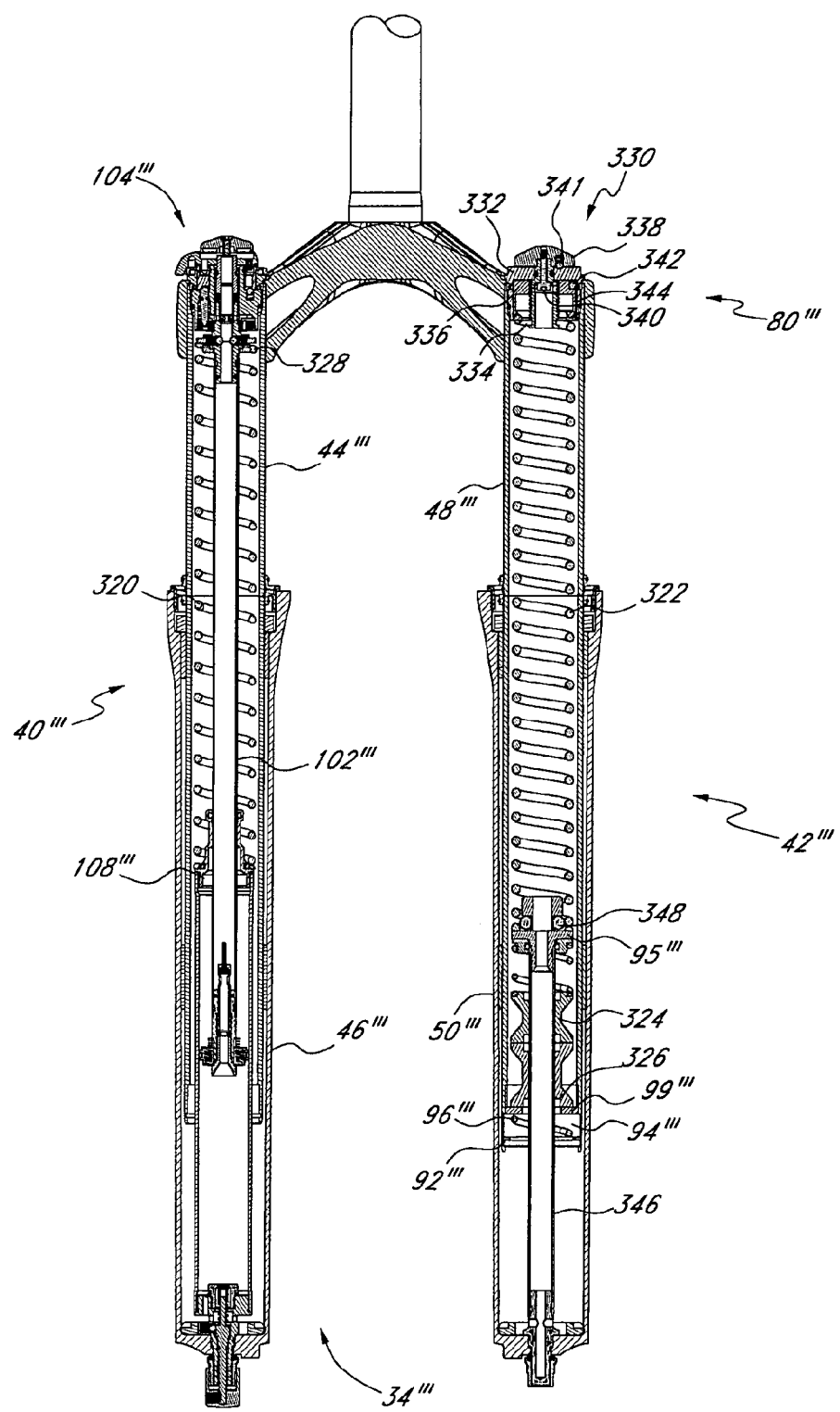
FIG. 16 is a cross-section of the coil-sprung fork of FIG. 15 in a shortened travel position.

FIGS. 15 and 16 illustrate a coil-sprung embodiment of the suspension fork, indicated generally by the reference character 34'''. Suspension fork 34''' is similar in both construction and function to the previously described suspension forks 34, 34' and 34". Accordingly, like components will be indicated with like reference numerals, except that a (''') will be added.

The coil-sprung fork 34''' utilizes a pair of positive coil springs to provide an expansion force on the fork 34'''. A first spring 320 is located in the right fork leg 40''', along with the damper assembly 76''', while a second spring 322 is located in the left leg 42''', in place of the air spring arrangement of the previous embodiments. When suspension action is of primary concern, rather than the overall weight of the fork assembly, a pair of coil springs may be advantageous. With a coil spring 320, 322 located in each of the fork legs 40''', 42''', respectively, the expansion force on the fork 34''' is more equally balanced between the fork legs 40''', 42'''. This enhances the coaxial telescopic motion of the upper legs 44''', 48''' relative to the lower legs 46''', 50''' during compression and rebound for smooth motion with reduced binding.

The first spring 320 is positioned in the right leg 40''' between the damper cap assembly 104''' and the cartridge tube cap 108'''. A pair of spacers, including a first spacer 324 and a second spacer 326, are interposed between the damper cap assembly 104''' and the first spring 320. The spacers 324, 326 are preferably substantially C-shaped so that they may be easily removed from the damper shaft 102''' in a radial direction. Desirably, the spacers 324, 326 are configured to engage the damper shaft 102''' in a snap fit arrangement.

A spring guide 328 is positioned between the spring 320 and the spacer immediately adjacent the spring 320 (spacer 326 in the illustrated embodiment) to assist in keeping the spring 320 concentric with the damper shaft 102'''. The cartridge tube cap 108''' functions as a spring guide for the lower end of the first spring 320. However, a separate spring guide member may also be provided.

The second spring 322 is positioned in the left leg 42''' between the spring cap assembly 80''' and the upper spring stop 95'''. A first spacer 324 and a second spacer 326 are positioned between the spring cap assembly 80''' and the spring 322. Desirably, the first and second spacers 324, 326 are substantially identical to the spacers described above in relation to the first spring 320.

A preload adjuster assembly 330 is desirably provided to allow adjustment of the preload on the second spring 322. The preload adjuster assembly 330 generally comprises an adjuster cap 332, an adjuster shaft 334, a barrel 336 and an adjuster knob 338. The cap 332 is sealingly engaged with upper open end of the upper tube 48'''. The cap 332 includes a central aperture which allows the adjuster shaft 334 to pass through, preferably in a sealed arrangement. The adjuster knob 338 is fixed to the adjuster shaft 334 by fastener 340 such that rotation of the adjuster knob 338 results in rotation of the adjuster shaft 334. A ball detent assembly 341, substantially similar to those described above, may be provided between the cap 332 and the adjuster knob 338 to define a plurality of preload adjustment positions.

The barrel 336 is threadably engaged with the adjuster shaft 334 and engages the upper most spacer 326. In addition, the barrel 336 includes a ball pocket for holding a ball bearing 342, which rides within an axial groove 344 defined by the adjuster cap 332. This arrangement prevents the barrel 336 from rotating relative to the adjuster cap 332. Accordingly, rotation of the adjuster shaft 334, via the adjuster knob 338, results in translation of the barrel 336 relative to the adjuster cap 332. A change in the axial position of the barrel 336 alters the preload force on the spring 322.

The upper spring stop 95''' is roll-crimped to a plunger rod 346 which extends upward from the closed end of the lower fork tube 50'''. The upper stop 95''' includes an o-ring 348 which serves as a spring guide for the lower end of the spring 322. The o-ring 348 is preferred because its compressibility allows a single size of o-ring to accommodate a number of different spring inner diameters. The inner diameter of a spring may vary with different spring rates, therefore, the o-ring 348 allows a number of springs 322 having varying spring rates to be used with the fork 34'''. A negative spring chamber 94''' is defined between the upper spring stop 95''' and the lower spring stop 92'''. A single negative spring 96''' is provided, rather than the dual negative coil spring arrangement of previous embodiments.

The fork assembly 34''' of FIGS. 15 and 16 is capable of being adjusted for varying amounts of travel, or total distance between its fully compressed and fully extended positions. With reference to FIG. 16, the fork 34''' has been configured to have less travel than the fork 34''' as configured in FIG. 15. To accomplish this, the spacers 324, 326 of the left leg 42''' were moved from their position between the upper end of the spring 322 and the spring cap assembly 80''' to a position below the plunger rod 346. Specifically, the upper spring guide 99''' is slid downward on the plunger rod 346 and the spacers 324, 326 are positioned between the upper spring guide 99''' and the upper spring stop 95'''. This lowers the upper tubes 44''', 48''' relative to the lower tubes 46''', 50''' and shortens the travel of the fork 34''' by the combined length of the spacers 324, 326. In order to accommodate the shorter travel configuration without altering the preload on the first compression spring 320, the spacers 324, 326 (FIG. 15) are removed from the right fork leg 40.

Preferably, the first spacer 324 is approximately 20 mm in length and the second spacer 326 is approximately 25 mm in length. The travel of the fork 34''' as configured in FIG. 15 is approximately 125 mm. As configured in FIG. 16, the travel is reduced to 80 mm. Alternatively, only one of the spacers 324, 326 may be positioned below the upper spring stop 95''' while the other spacer remains positioned above the spring 324. With this configuration, the fork travel would be shortened by the length of the spacer positioned below the upper spring stop 95''', either 20 mm or 25 mm. The corresponding spacer 324, 326 would be removed from the right fork leg 40, to maintain the desired preload on the spring 320, as described above. Additionally, varying spacer configurations could be used. For example, the spacers 324, 326 could be replaced by a single spacer. Also, spacers of other lengths may be used, as can readily be determined by one of skill in the art.

Although this invention has been described in terms of certain embodiments, other embodiments apparent to those of ordinary skill in the art are also within the scope of this invention. Thus, various changes and modifications may be made without departing from the spirit and scope of this invention. In addition, various combinations of the preferred embodiments are possible. For example, any of the base valve assemblies may be used in conjunction with any of the damper cap assemblies, if desired.

Additionally, various arrangements of the damper and suspension spring elements may be used. For example, the damper assembly and spring assembly may be contained within a single leg of the fork, with the other leg being substantially empty. Further, the fork could be configured to have a single fork leg, with both the damper and suspension spring elements being arranged within the single leg. Also, the fork may be configured for use with other vehicles, such as a road bicycle or motorcycle, for example. Accordingly, the scope of the invention is intended to be defined only by the appended claims.

What we claim is:

1. A damper assembly, comprising:
    a damper cap assembly closing an upper end of a first member engaged with a second member of said damper assembly, wherein said damper cap assembly comprises:
        a damper cap body having a first set of threads;
        a compression piston;
        a compression shim stack; and
        a damper shaft extending vertically downward from said damper cap assembly and supporting a rebound damping assembly on its lower end, wherein said rebound damping assembly is fixed for movement with said first member and comprises a central passage having positioned therein a rebound adjust rod, wherein a first compression chamber is defined between said rebound adjust rod and an inner surface of said damper shaft;
    a shaft support coupling said damper cap body and said damper shaft, wherein, said shaft support having a second set of threads for mating with said first set of threads, wherein upon said mating, said compression piston and said compression shim stack are secured between said damper cap body and said shaft support, wherein said shaft support comprises:
        a set of radial ports enabling fluid communication with at least said first compression chamber;
    a shoulder axially spacing said compression piston from said cap body, said shoulder comprising:
        a set of radial passages enabling fluid communication with at least a second compression chamber that is created, by said axially spacing, between an upper surface of said compression piston and a lower surface of said cap body; and
    a transfer chamber coupling said set of radial ports to said set of radial passages, said transfer chamber enabling said fluid to flow between said first compression chamber and said second compression chamber while allowing a threaded connection between said cap body and said shaft support.

2. The damper assembly of claim 1, wherein said rebound adjust rod extends vertically downward from said damper cap assembly and is fixed for rotation with a rebound adjustment knob.

3. The damper assembly of claim 1, wherein said compression piston comprises:
    a mid-speed damping circuit comprising a plurality of mid-speed compression ports passing axially there through, wherein said plurality of mid-speed compression ports are disposed at a first radial distance D1 from a center axis A of said compression piston; and
    a low speed damping circuit comprising one low speed compression port passing axially there through, wherein said one low speed compression port is disposed at a second radial distance D2 from said center axis A, wherein said distance D1 is less than said distance D2, such that fluid flowing through said on low speed compression port has more leverage on said compression shim stack in comparison to fluid flowing through said plurality of mid-speed compression ports.

4. The damper assembly of claim 1, further comprising:
    a lock-out valve of said first member, said lock-out valve having at least two positions, one position of said lock-out valve at least substantially inhibiting said first member from further engaging with said second member when subjected to a compressive force less than an adjustable threshold pressure;
    a blow-off valve of said second member allowing said first member to further engage with said second member in response to a pressure imparted on said blow-off valve during compression of said first member and said second member being equal to or greater than said adjustable threshold pressure when said lock-out valve is in its substantially inhibiting movement position;
    a first external adjuster permitting adjustment of said lock-out valve from a location external of said damper assembly;

a damping fluid chamber comprising a compression chamber and a rebound chamber separated by a piston, said damping fluid chamber positioned at least partially in said second member; and at least one adjustable damping mechanism positioned in said first member and selectively blocks said fluid flowing through said flow channel, thereby selectively affecting movement of said piston.

5. The damper assembly of claim 4, further including a second external adjuster permitting adjustment selection of positions of said blow-off valve from a second location external of said damper assembly.

6. The vehicle suspension of claim 1 wherein said first and second members are telescopically engagable tubes.

7. The vehicle suspension of claim 1, wherein said at least one adjustable damping mechanism comprises:

at least one shim of said compression shim stack.

8. The vehicle suspension of claim 1, wherein said at least one adjustable damping mechanism is part of said damper cap assembly.

\* \* \* \* \*